(12) United States Patent
Antonich

(10) Patent No.: US 8,632,120 B2
(45) Date of Patent: Jan. 21, 2014

(54) UNIVERSAL LATCH MECHANISM

(75) Inventor: Gary L. Antonich, St. Francis, MN (US)

(73) Assignee: BAE Systems Land & Armaments L.P., Santa Clara, CA (US)

(*) Notice: Subject to any disclaimer, the term of this patent is extended or adjusted under 35 U.S.C. 154(b) by 76 days.

(21) Appl. No.: 13/304,016

(22) Filed: Nov. 23, 2011

(65) Prior Publication Data

US 2012/0139293 A1 Jun. 7, 2012

Related U.S. Application Data

(63) Continuation-in-part of application No. 11/939,862, filed on Nov. 14, 2007, now Pat. No. 8,066,319.

(60) Provisional application No. 60/872,386, filed on Dec. 1, 2006, provisional application No. 60/919,748, filed on Mar. 23, 2007.

(51) Int. Cl.
*B60J 7/00* (2006.01)

(52) U.S. Cl.
USPC ........................................... 296/187.07

(58) Field of Classification Search
USPC .............. 296/187.07, 146.1, 146.11, 152; 109/49.5, 78; 297/465; 29/428; 89/36.02, 36.01, 36.04, 36.08, 36.09, 89/903, 905, 36.14
See application file for complete search history.

(56) References Cited

U.S. PATENT DOCUMENTS

| | | | |
|---|---|---|---|
| 1,632,360 A | 6/1927 | Wilson | |
| 2,273,971 A | 2/1942 | Love | |
| 3,397,005 A | 8/1968 | May et al. | |
| D215,814 S | 11/1969 | Kraus | |
| 3,671,370 A | 6/1972 | Littell, Jr. | |
| 3,720,196 A * | 3/1973 | Barnett et al. | 126/197 |
| 3,739,527 A * | 6/1973 | Schubach | 49/466 |

(Continued)

FOREIGN PATENT DOCUMENTS

| | | |
|---|---|---|
| DE | 19733034 A1 | 2/1999 |
| EP | 0968861 A2 | 1/2000 |
| TW | M 298632 | 10/2006 |
| WO | WO 2011/046668 A1 | 4/2011 |

OTHER PUBLICATIONS

Application and File History for U.S. Appl. No. 13/279,838, filed Oct. 24, 2011. Inventors: Michael L. Hafften et al. www.uspto.gov.

(Continued)

*Primary Examiner* — Kiran B Patel
(74) *Attorney, Agent, or Firm* — Patterson Thuente Pedersen, P.A.

(57) ABSTRACT

A latch mechanism for removably coupling at least one transparent armor assembly being in a vehicle window sill, the at least one transparent armor assembly including a frame that supports at least one transparent armor pane, the latch mechanism includes a latch mechanism assembly, the latch mechanism assembly being selectively operable by a vehicle occupant for effecting release of the at least one transparent armor assembly, such release permitting shifting of the at least one transparent armor assembly from the vehicle window frame to define an egress portal and the latch mechanism having an engaging member for selectively engaging the vehicle window frame, latch mechanism assembly being shiftable relative to the transparent armor assembly frame for accommodating a plurality of varying transparent armor assembly to vehicle window frame relationships. A method for removably coupling at least one transparent armor assembly to a vehicle window sill is further included.

9 Claims, 26 Drawing Sheets

(56) References Cited

U.S. PATENT DOCUMENTS

| | | | |
|---|---|---|---|
| 3,881,330 A * | 5/1975 | Hester | 70/1.5 |
| 3,923,339 A * | 12/1975 | McDonald | 296/95.1 |
| 4,005,662 A | 2/1977 | Kohn et al. | |
| D248,822 S | 8/1978 | Taniwaki | |
| 4,103,671 A * | 8/1978 | Smith | 126/200 |
| 4,167,889 A | 9/1979 | Bohne et al. | |
| 4,303,264 A | 12/1981 | Uehara | |
| 4,316,404 A | 2/1982 | Medlin | |
| 4,333,282 A | 6/1982 | Medlin | |
| 4,336,644 A | 6/1982 | Medlin | |
| 4,351,558 A | 9/1982 | Mueller | |
| 4,352,316 A | 10/1982 | Medlin | |
| 4,489,639 A | 12/1984 | Winkler et al. | |
| 4,495,852 A | 1/1985 | Winkler et al. | |
| 4,502,719 A | 3/1985 | Perry | |
| H000129 H | 9/1986 | Hansen | |
| 4,625,659 A | 12/1986 | Saelzer | |
| 4,635,396 A * | 1/1987 | Ranz et al. | 49/141 |
| 5,070,764 A | 12/1991 | Shevach et al. | |
| 5,169,205 A * | 12/1992 | James | 296/146.16 |
| 5,386,747 A * | 2/1995 | Grover | 81/63 |
| 5,438,908 A | 8/1995 | Madden, Jr. | |
| 5,442,880 A * | 8/1995 | Gipson | 49/413 |
| 5,474,352 A * | 12/1995 | Davies | 296/24.3 |
| 5,475,352 A | 12/1995 | Hoffmann et al. | |
| 5,487,323 A | 1/1996 | Madden, Jr. | |
| H001519 H | 3/1996 | Semple | |
| 5,533,778 A | 7/1996 | Sheridan | |
| H001567 H | 8/1996 | Parsons et al. | |
| 5,594,193 A | 1/1997 | Sheridan | |
| 5,663,520 A * | 9/1997 | Ladika et al. | 296/187.07 |
| 5,666,830 A * | 9/1997 | Litvin | 70/129 |
| 5,679,918 A | 10/1997 | Korpi et al. | |
| 5,738,403 A | 4/1998 | Tyson | |
| 5,746,026 A | 5/1998 | Brede et al. | |
| 5,792,974 A | 8/1998 | Daqis et al. | |
| 5,811,719 A | 9/1998 | Madden, Jr. | |
| 5,857,730 A | 1/1999 | Korpi et al. | |
| 5,939,658 A | 8/1999 | Muller | |
| 6,164,715 A | 12/2000 | Mosaner | |
| 6,302,010 B1 | 10/2001 | Holler | |
| 6,327,954 B1 | 12/2001 | Medlin | |
| 6,408,733 B1 | 6/2002 | Perciballi | |
| 6,427,383 B1 * | 8/2002 | Brooks et al. | 49/141 |
| 6,427,505 B2 | 8/2002 | Ocana | |
| 6,565,133 B1 | 5/2003 | Timothy | |
| 6,659,527 B1 | 12/2003 | Wilson | |
| 6,719,355 B2 | 4/2004 | Ornig et al. | |
| 6,818,268 B2 | 11/2004 | Gonzalez | |
| 7,029,038 B2 * | 4/2006 | Kobrehel | 292/74 |
| 7,070,242 B2 | 7/2006 | Mears et al. | |
| 7,191,694 B1 | 3/2007 | Gonzalez | |
| 7,225,718 B1 | 6/2007 | Grove et al. | |
| 7,232,181 B2 | 6/2007 | Schmucker | |
| 7,254,927 B1 | 8/2007 | Farrar et al. | |
| 7,458,306 B2 | 12/2008 | Singh et al. | |
| 7,493,844 B2 * | 2/2009 | Martin | 89/36.07 |
| 7,536,817 B2 | 5/2009 | Storch | |
| 7,549,366 B2 | 6/2009 | Park et al. | |
| 7,695,053 B1 | 4/2010 | Boczek et al. | |
| D615,383 S | 5/2010 | Donaldson et al. | |
| D615,841 S | 5/2010 | Donaldson et al. | |
| 7,832,789 B2 * | 11/2010 | Craigo et al. | 296/146.11 |
| 7,905,534 B2 | 3/2011 | Boczek et al. | |
| 8,066,319 B2 * | 11/2011 | Hafften et al. | 296/146.1 |
| 8,333,036 B2 * | 12/2012 | Helms et al. | 49/141 |
| 2002/0058450 A1 | 5/2002 | Yeshurun et al. | |
| 2003/0190439 A1 | 10/2003 | Gonzalez | |
| 2003/0221547 A1 | 12/2003 | Peretz | |
| 2004/0075283 A1 | 4/2004 | Kobrehel | |
| 2006/0087130 A1 | 4/2006 | Liang | |
| 2006/0175866 A1 * | 8/2006 | Dankert et al. | 296/146.16 |
| 2006/0288856 A1 | 12/2006 | Labock | |
| 2007/0085350 A1 | 4/2007 | Liang et al. | |
| 2010/0024633 A1 | 2/2010 | Piscitelli | |
| 2010/0071537 A1 | 3/2010 | Weber et al. | |
| 2010/0192643 A1 | 8/2010 | Liang et al. | |
| 2011/0084521 A1 * | 4/2011 | Shellenberger et al. | 296/193.08 |
| 2011/0291849 A1 | 12/2011 | Helms et al. | |
| 2012/0032470 A1 * | 2/2012 | Hafften et al. | 296/146.1 |
| 2012/0048102 A1 | 3/2012 | Nahmias et al. | |
| 2012/0124766 A1 | 5/2012 | Antonich et al. | |
| 2012/0167476 A1 * | 7/2012 | Weinerman et al. | 49/460 |

OTHER PUBLICATIONS

Application and File History for U.S. Appl. No. 11/939,862, filed Nov. 14, 2007. Inventors: Michael L. Hafften et al. www.uspto.gov.

International Search Report from PCT Application PCT/US2012/065971, dated Apr. 1, 2013, 3 pgs.

* cited by examiner

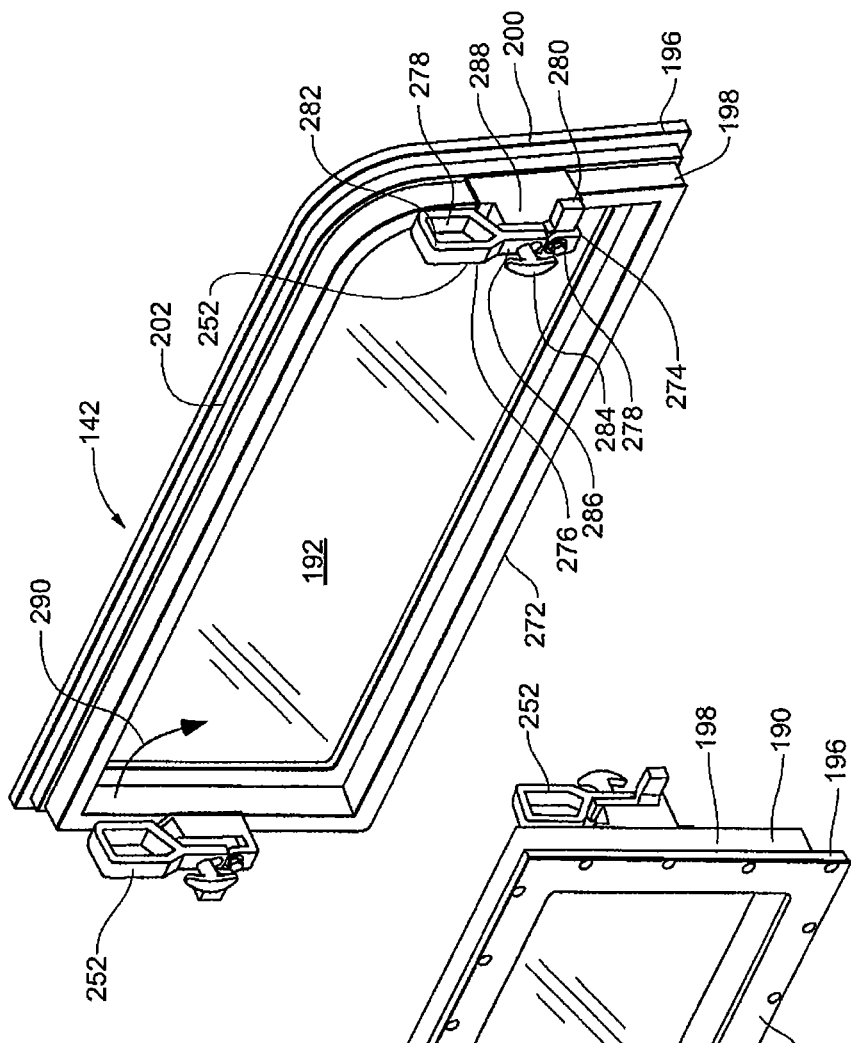
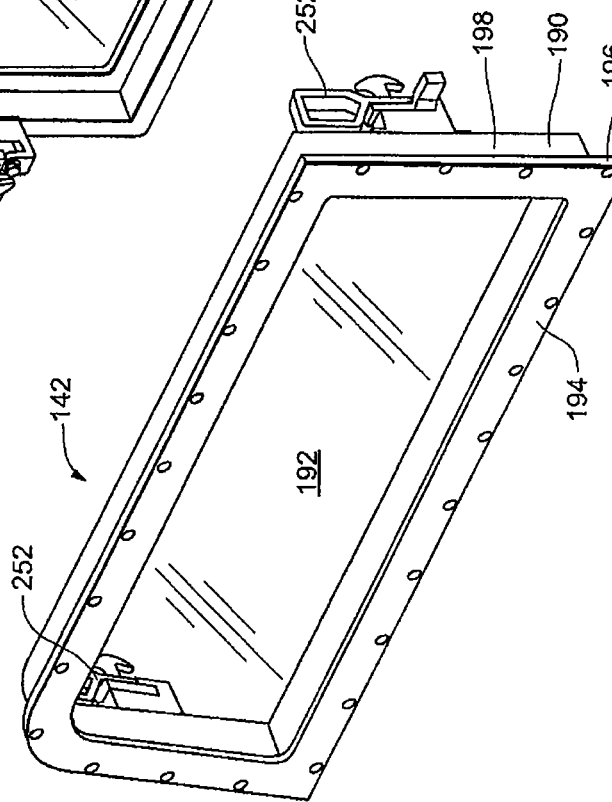

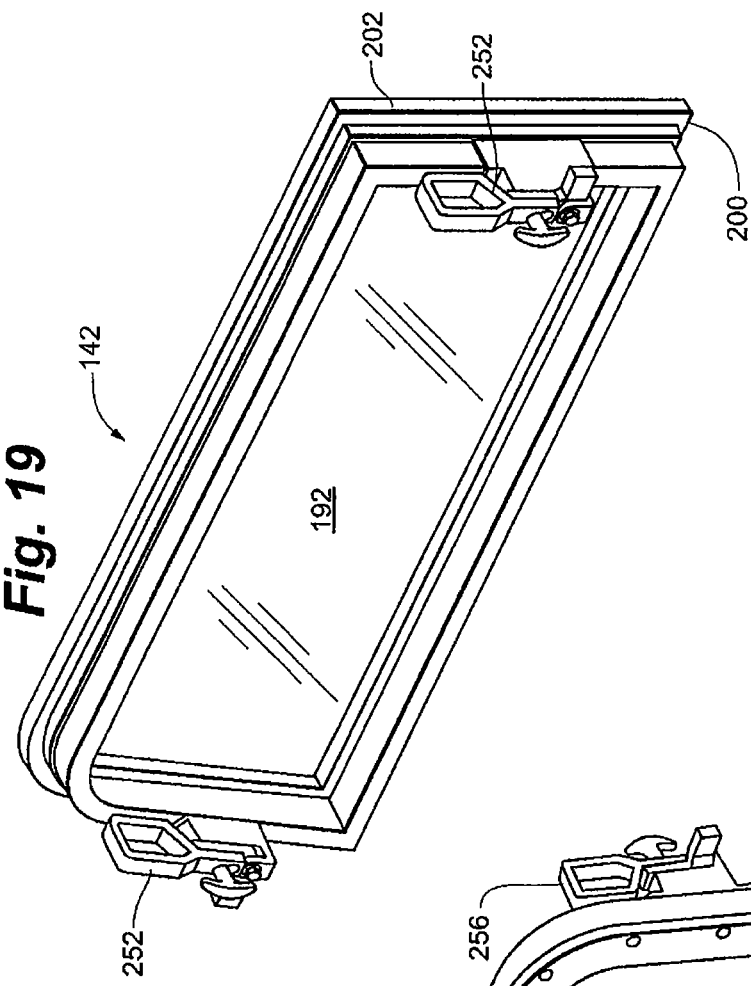
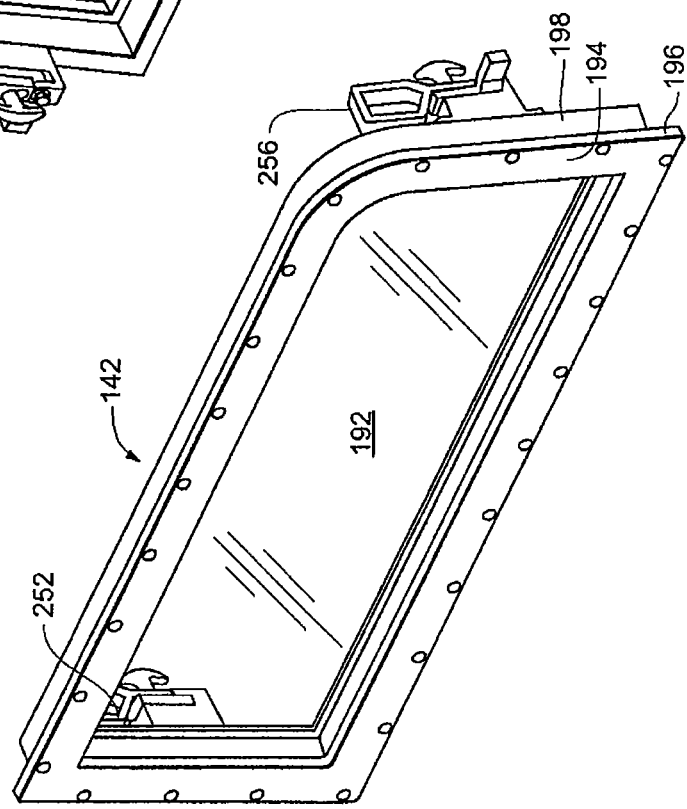

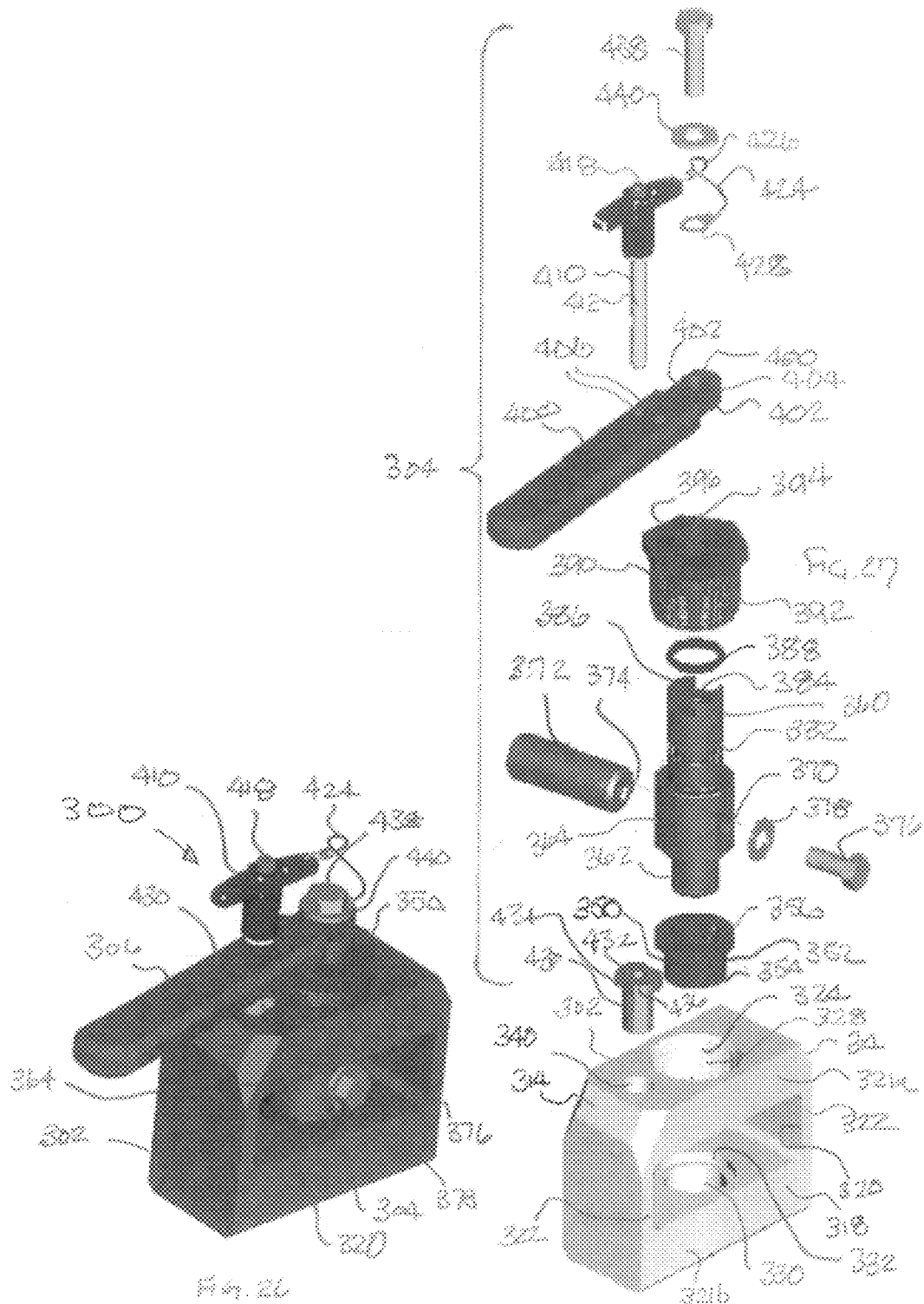

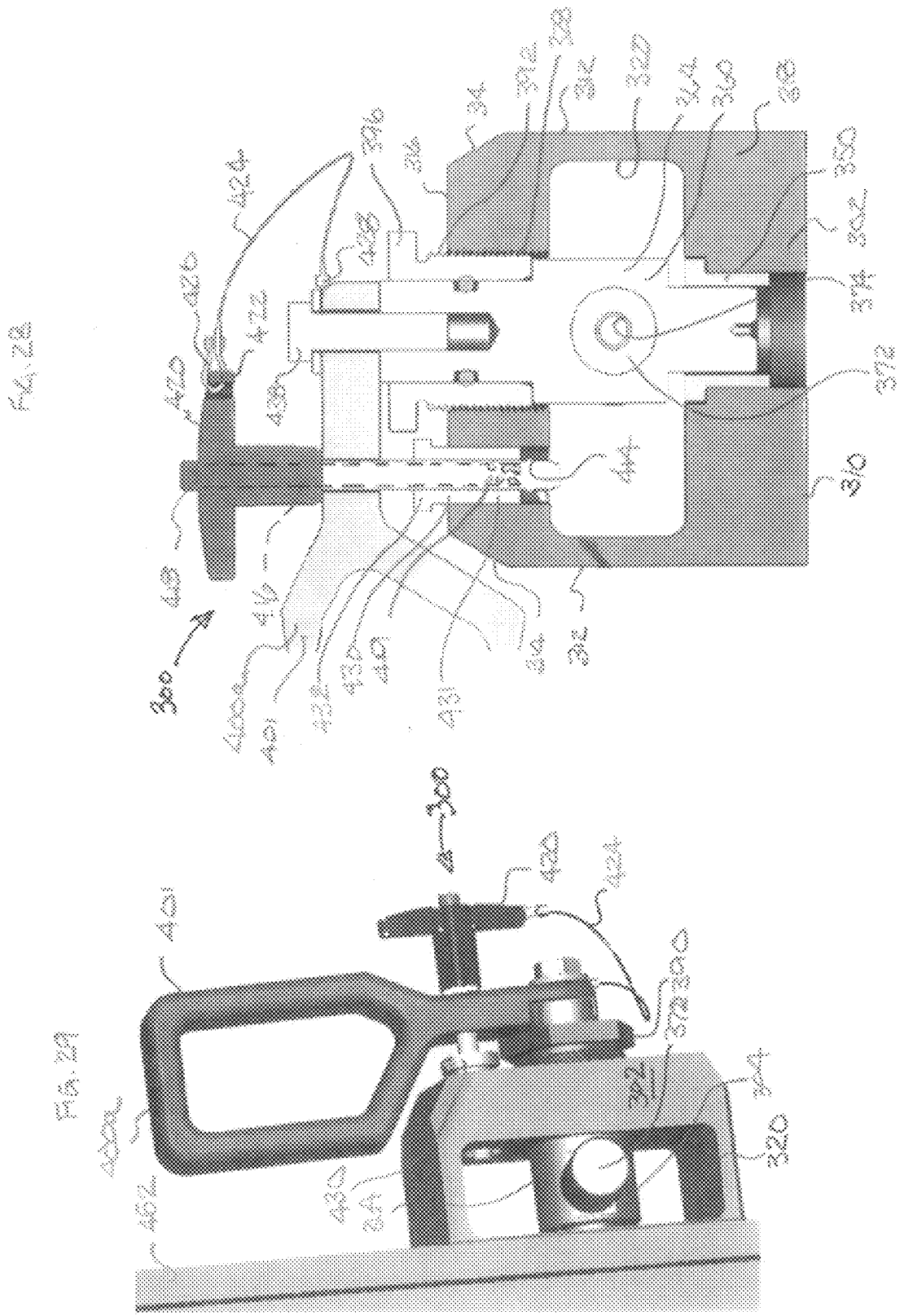

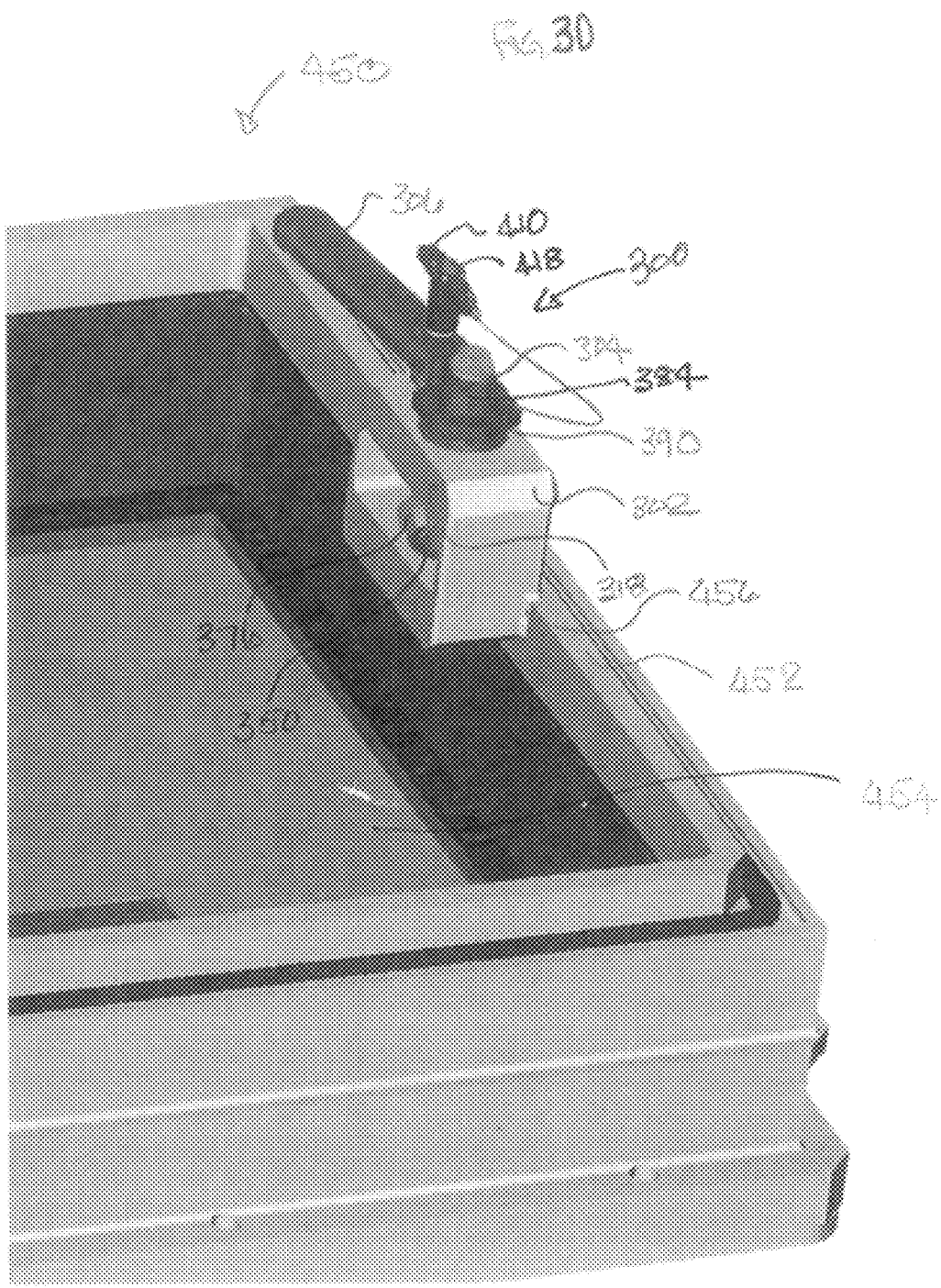

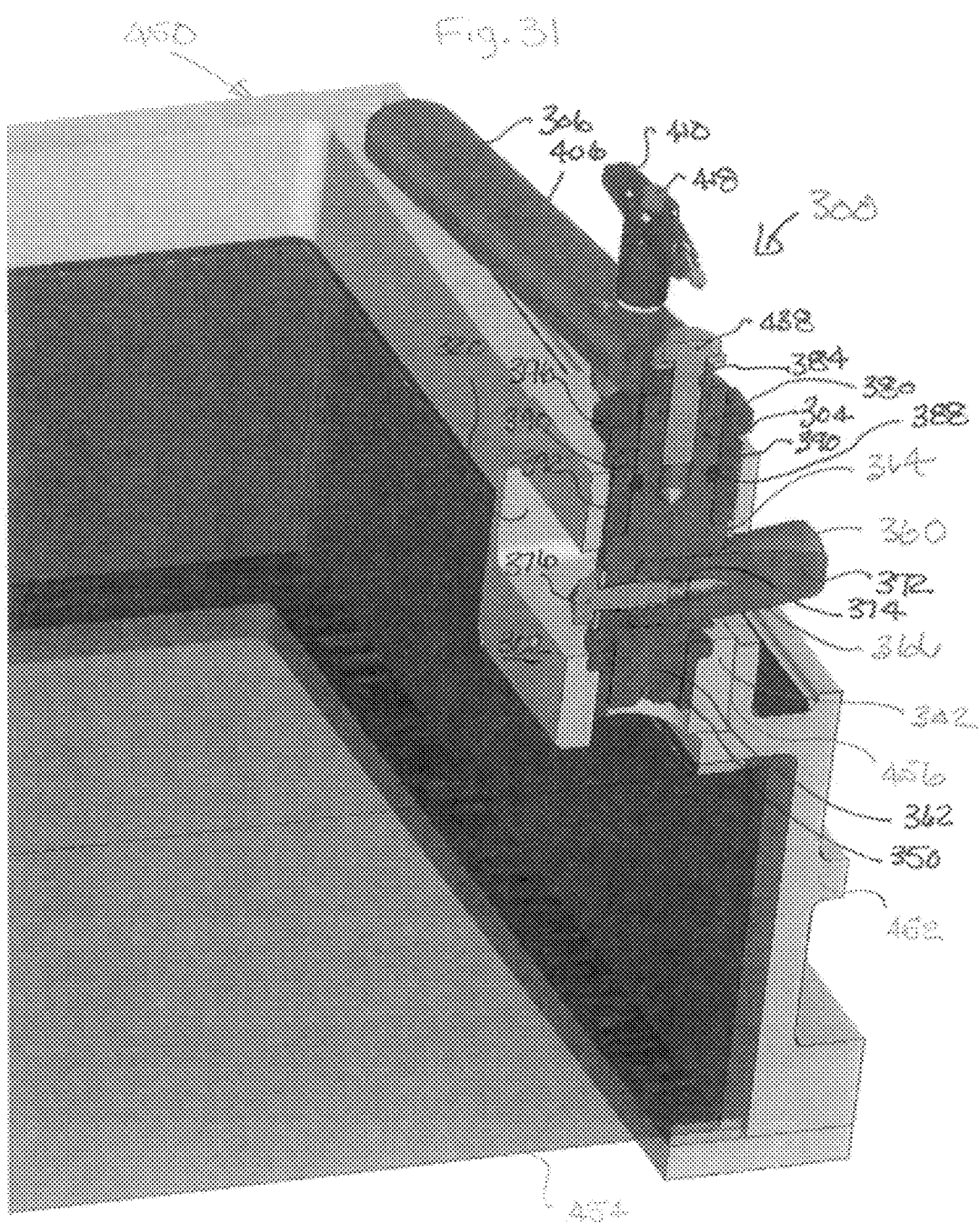

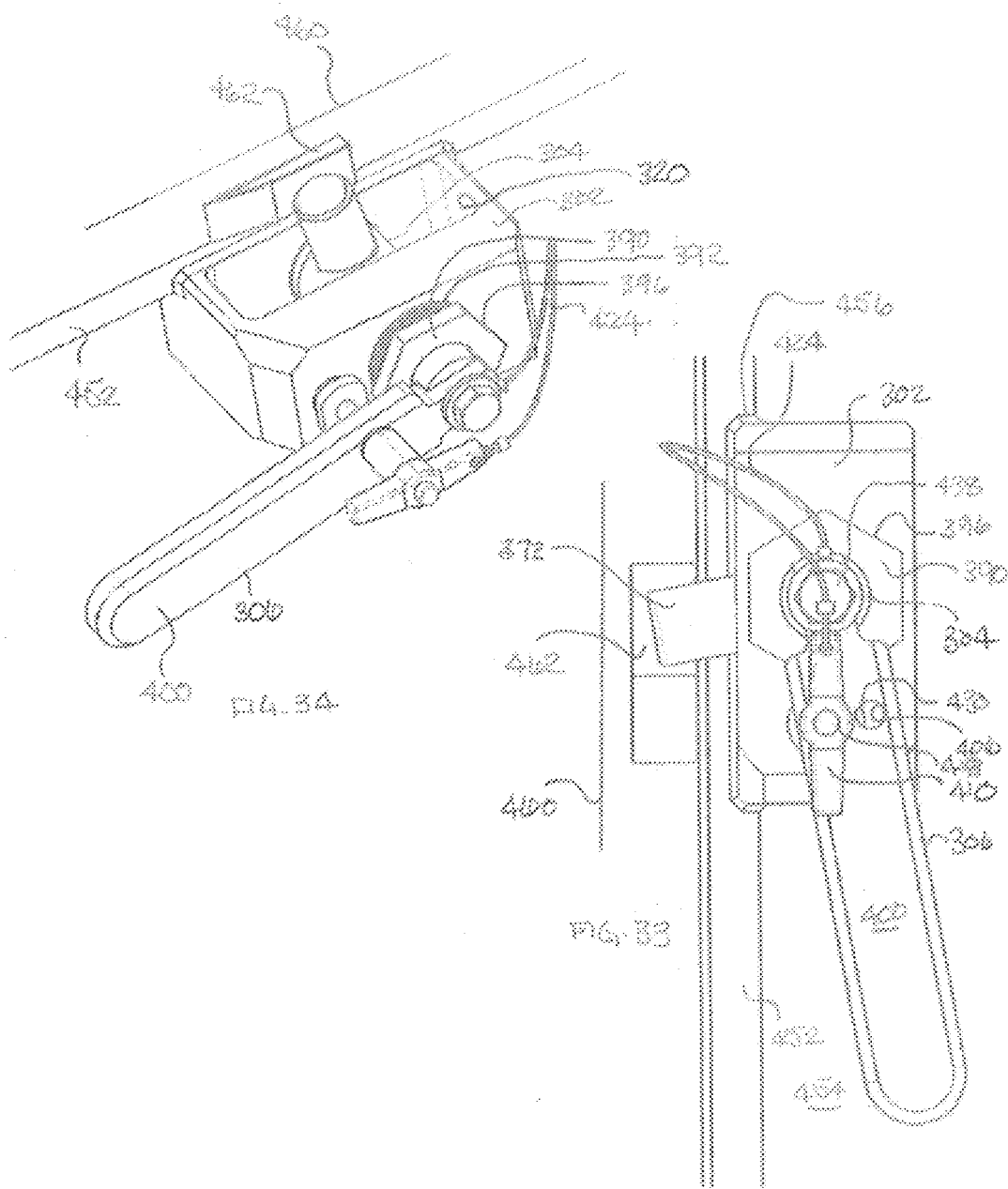

UNIVERSAL LATCH MECHANISM

RELATED APPLICATIONS

This application is a continuation-in-part of application Ser. No. 11/939,862 filed Nov. 14, 2007, which claims the benefit of U.S. Provisional Application No. 60/872,386 filed Dec. 1, 2006, and U.S. Provisional Application No. 60/919,748 filed Mar. 23, 2007, each of which are incorporated herein in their entirety by reference.

FIELD OF THE INVENTION

The present invention relates to an emergency egress window of an armor vehicle, and specifically an interior egress system for occupants to rapidly remove a window from the frame of an armor vehicle.

BACKGROUND OF THE INVENTION

Insurgent attacks on U.S. troops supporting ongoing operations for the Global War On Terrorism (GWOT) in Iraq and Afghanistan have exposed vulnerabilities of the ground vehicles used by our troops. Consequently, the HMMWV (commonly known as HumVee) and other light tactical military vehicles, including the Light Utility Vehicle testbed by Millen Works, are being up-armor to counter the insurgent threats and provide an increased level of soldier protection. A new issue results in that the additional weight of the armor and associated upward shift in center of gravity (CG) has caused these vehicles to become increasingly unstable and difficult for the troops to control. Numerous rollover accidents have and continue to occur given the tendency of these vehicles to go out of control and tip during evasive maneuvering, off-road travel and IED/RPG attack. When an up-armor vehicle rolls over, many times the crew cannot egress via the doors due to the weight of the armor on the doors, or jamming of doors from the vehicle frame twisting. The gunner's station is not an option for exit either if the vehicle is up-side-down. The result is that the crew is often killed due to vehicle fires, follow-up insurgent attacks, trauma injuries and drowning. Therefore there is a need for an emergency egress system for the up-armor vehicles.

A number of prior art examples exist with regards to emergency egress systems for vehicles. U.S. Pat. No. 3,739,527, issued Jun. 19, 1973, entitled KNOCKOUT WINDOW FOR VEHICLE, discloses a knockout window for a vehicle, such as a bus or mass transit car, U.S. Pat. No. 4,635,396, issued Jan. 13, 1987, entitled BUS WINDOW RELEASE MECHANISM, discloses a release mechanism for a vehicle, and U.S. Pat. No. 6,164,715, issued Dec. 26, 2000, entitled EMERGENCY EXIT WINDOW OF A VEHICLE WITH A WINDOW PANEL, discloses an emergency exit window of a vehicle. However, these prior art examples involve mechanisms that are incompatible with the transparent armor assembly required by military vehicles. The egress architecture must provide the crew the required level of blast protection while still meeting the unique interface and support structure requirements for the transparent armor assembly.

A standard (prior art) M1114 window armor assembly 8 is illustrated in prior art FIGS. 1 and 2. Window frame 10 provides the supporting structure for a window armor frame 12 and the two pieces of transparent armor (ballistic glass) 14. Window frame 10 defines an aperture for window spacer/sill 16 and transparent armor 14. The window armor frame 12 is disposed about the periphery of the transparent armor 14. The window armor frame 12 generally includes six separate armor plates: upper window armor plate 18, center armor plate 20, side armor plates 22 and the lower window armor plate 24. The window armor frame 12 overlies portions of both pieces of transparent armor 14 as at overlap 15, thereby capturing the transparent armor 14 in the frame 10. The individual plates, i.e. upper window armor plate 18, center armor plate 20, side armor plates 22, and lower window armor plate 24 of the window armor frame 12 are fastened by screws or similar type fasteners that extend into the windshield frame 10. The window frame 10 is fitted to the vehicle side armor 19. In an emergency situation, removal of transparent armor 14 is not possible by the occupant as the transparent armor 14 is secured by the window armor frame 12 from the exterior of the vehicle. Someone outside the vehicle would have to remove all of the fasteners of the window armor frame 12 before accessing the transparent armor 14, a time consuming operation that needlessly exposes the person performing the operation under combat conditions.

There is therefore a need for an improved alternate or additional egress capability for up-armor vehicles to address the previously described problem, especially the capability for the vehicle occupants to effect the egress without exterior assistance.

SUMMARY OF THE INVENTION

The objective of this invention is to provide a manual means for the crew of the vehicle to easily remove the transparent armor assembly for the purpose of exiting the vehicle in emergency situations. Provision of the additional egress option provided by this invention increases the probability of survival for the crew members of up-armor vehicles. This invention provides an alternate means of egress while still maintaining and not compromising the required levels of protection for the crew from small arms fire and exterior blast. It is a goal of this invention to be simple for the vehicle crew to operate in an emergency situation and inexpensive to produce.

An embodiment of this invention is intended to be integrated into up-armor light tactical military vehicles to provide the crew an alternative means of emergency egress as an integral unit without the plurality of armor plates noted above. Such integration can be a retrofit or can be installed at the time of vehicle construction. The focus of this embodiment is the integration of a new function into the ballistic glass (transparent armor) component of these vehicles. As noted, it has been discovered that up-armor of light vehicles has increased the probability of rollover accidents due to changes in vehicle mobility characteristics (principally an elevated center of gravity) resulting from the additional weight of the armor. In the event of a rollover or other accident the crew will typically attempt to exit the vehicle via the doors. For some accident situations the doors may be blocked or jammed and therefore trap the crew inside the vehicle.

This invention provides an option for the crew to exit via the windshield (or other windows) in these situations. Conceptually, this invention provides a crew actuated mechanism that releases the transparent armor assembly from the frame structure of the vehicle. In the event of a rollover or other accident that may render the doors of the vehicle unusable, a crew member can actuate a simple, manually operated release mechanism from the interior of the vehicle. Upon actuation and release the crew member can manually push to remove and eject the windshield transparent armor assembly to the exterior of the vehicle. The resulting portal of the vehicle window frame structure provides the crew with an emergency egress option.

In another embodiment, the implementation of a rotary locking mechanism is added to the transparent armor assembly. This mechanism integrates with the glass assembly frame. The locking mechanism provides support from the opposite side of the vehicle frame structure (interior to the vehicle) and secure the transparent armor assembly in place. An installation may require two or more lock mechanisms to be integrated with the frame. The lock mechanism can be released directly by the crew and requires no tools. Upon release the transparent armor assembly becomes unsecured and can be pushed out by the crew. This design has a benefit over other potential mechanical embodiments in that it is compliant and can reliably accommodate potential changes in vehicle window frame structure geometry that may occur as a result of a vehicle accident (i.e., rollover, IED).

The present invention is a latch mechanism for removably coupling at least one transparent armor assembly being in a vehicle window sill, the at least one transparent armor assembly including a frame that supports at least one transparent armor pane, the latch mechanism includes a latch mechanism assembly, the latch mechanism assembly being selectively operable by a vehicle occupant for effecting release of the at least one transparent armor assembly, such release permitting shifting of the at least one transparent armor assembly from the vehicle window frame to define an egress portal and the latch mechanism having an engaging member for selectively engaging the vehicle window frame, latch mechanism assembly being shiftable relative to the transparent armor assembly frame for accommodating a plurality of varying transparent armor assembly to vehicle window frame relationships. The present invention is further a method for removably coupling at least one transparent armor assembly to a vehicle window sill is further included.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE DRAWINGS

The invention may be more completely understood in consideration of the following detailed description of various embodiments of the invention in connection with the accompanying drawings, in which:

Prior Art

Prior Art

FIG. 16 is an exterior perspective view of a driver's window assembly;

FIG. 17 is an interior perspective view of the driver's window assembly of FIG. 16;

FIG. 18 is an exterior perspective view of a passenger's window assembly;

FIG. 19 is an interior perspective view of the passenger's window assembly of FIG. 18;

FIG. 26 is a perspective view of a latch mechanism of the present invention;

FIG. 27 is a perspective, exploded view of the latch mechanism of FIG. 26;

FIG. 28 is a sectional view of the latch mechanism of FIG. 26;

FIG. 29 is an elevational view of the latch mechanism of FIG. 28;

FIG. 30 is a perspective view of a latch mechanism of the present invention mated to a transparent armor assembly (TAA);

FIG. 31 is a sectional view of the latch mechanism of the present invention and of the transparent armor assembly (TAA);

FIG. 32 is a perspective view of a pair of latch mechanisms of the present invention and of the transparent armor assembly (TAA);

FIG. 33 is a perspective view of a latch mechanism of the present invention mated to a transparent armor assembly (TAA) and engaged with a window sill of a vehicle; and FIG. 34 is an elevational view of a latch mechanism of the present invention mated to a transparent armor assembly (TAA) and engaged with a window sill of a vehicle.

DETAILED DESCRIPTION OF THE DRAWINGS

In the following detailed description of the present invention, numerous specific details are set forth in order to provide a thorough understanding of the present invention. However, it will be obvious to one skilled in the art that the present invention may be practiced without these specific details. In other instances, well-known methods, procedures, and components have not been described in detail so as to not unnecessarily obscure aspects of the present invention.

Figure 1:
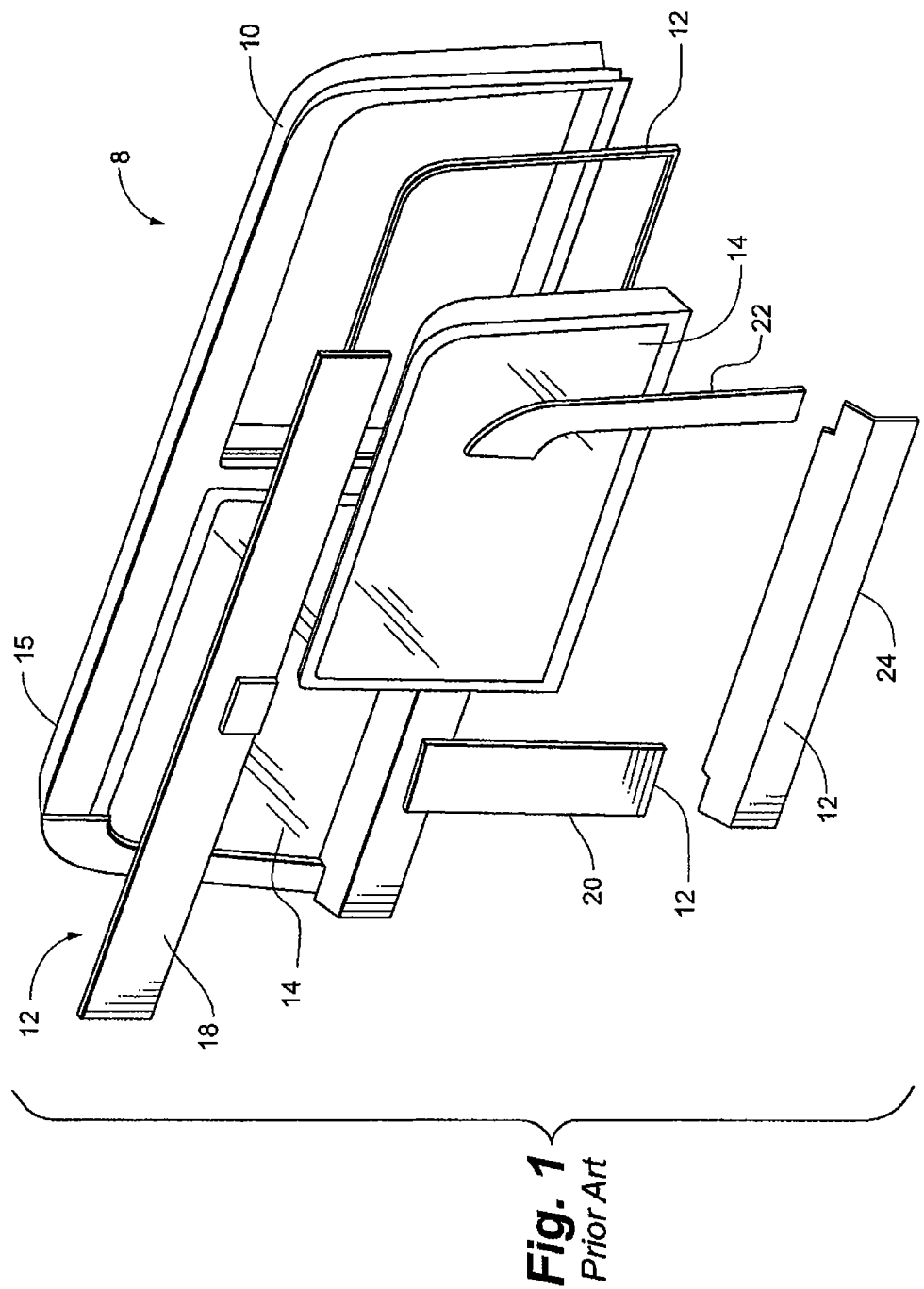
FIG. 1 is an exploded perspective view of a standard M1114 window assembly.
Figure 2:
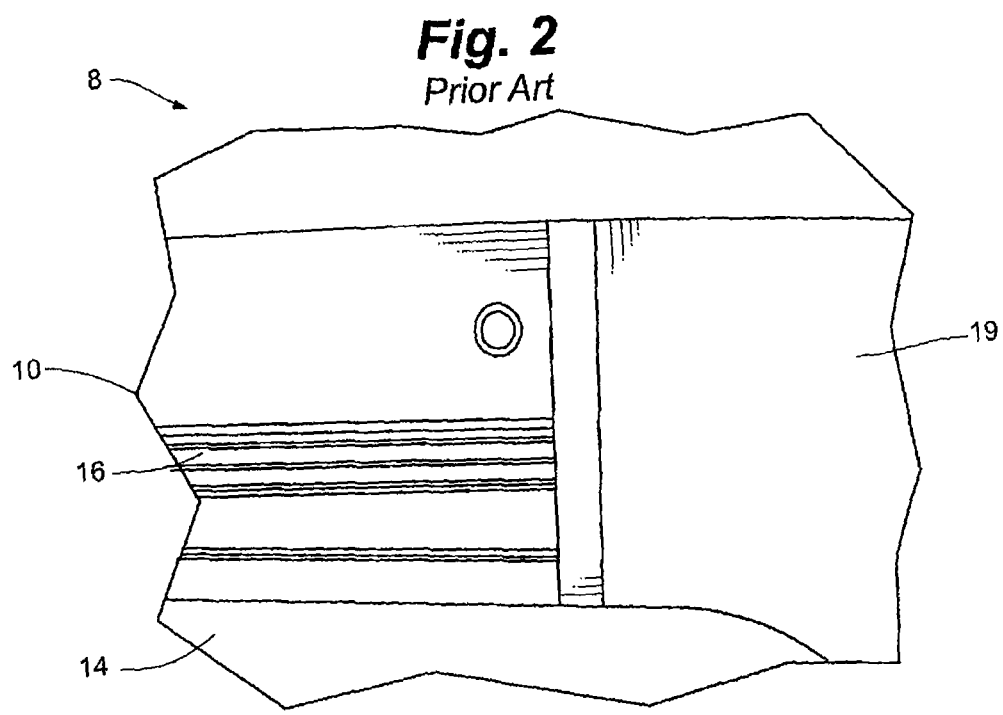
FIG. 2 is a sectional view of a portion of M1114 window assembly of FIG. 1.
Figure 3:
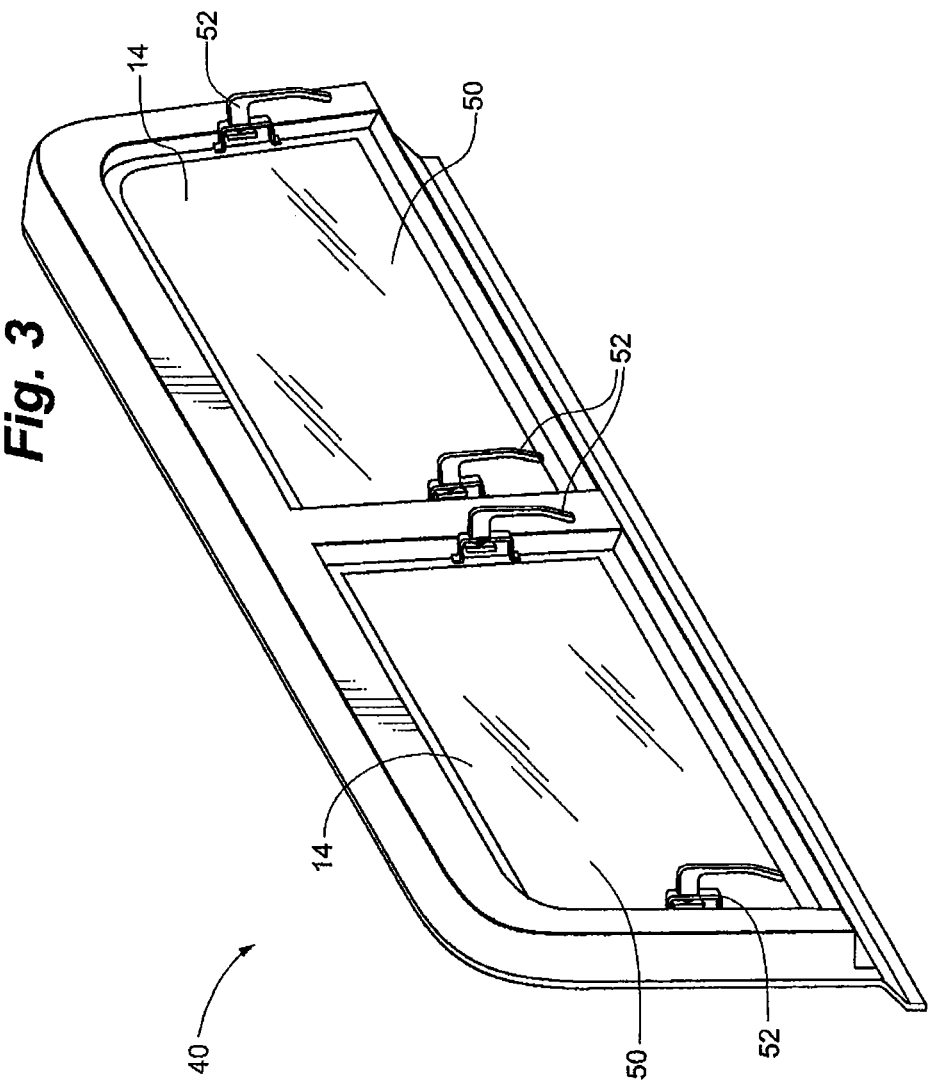
FIG. 3 is a perspective view of a M1114 windshield assembly with an embodiment of the present invention.
Figure 4:
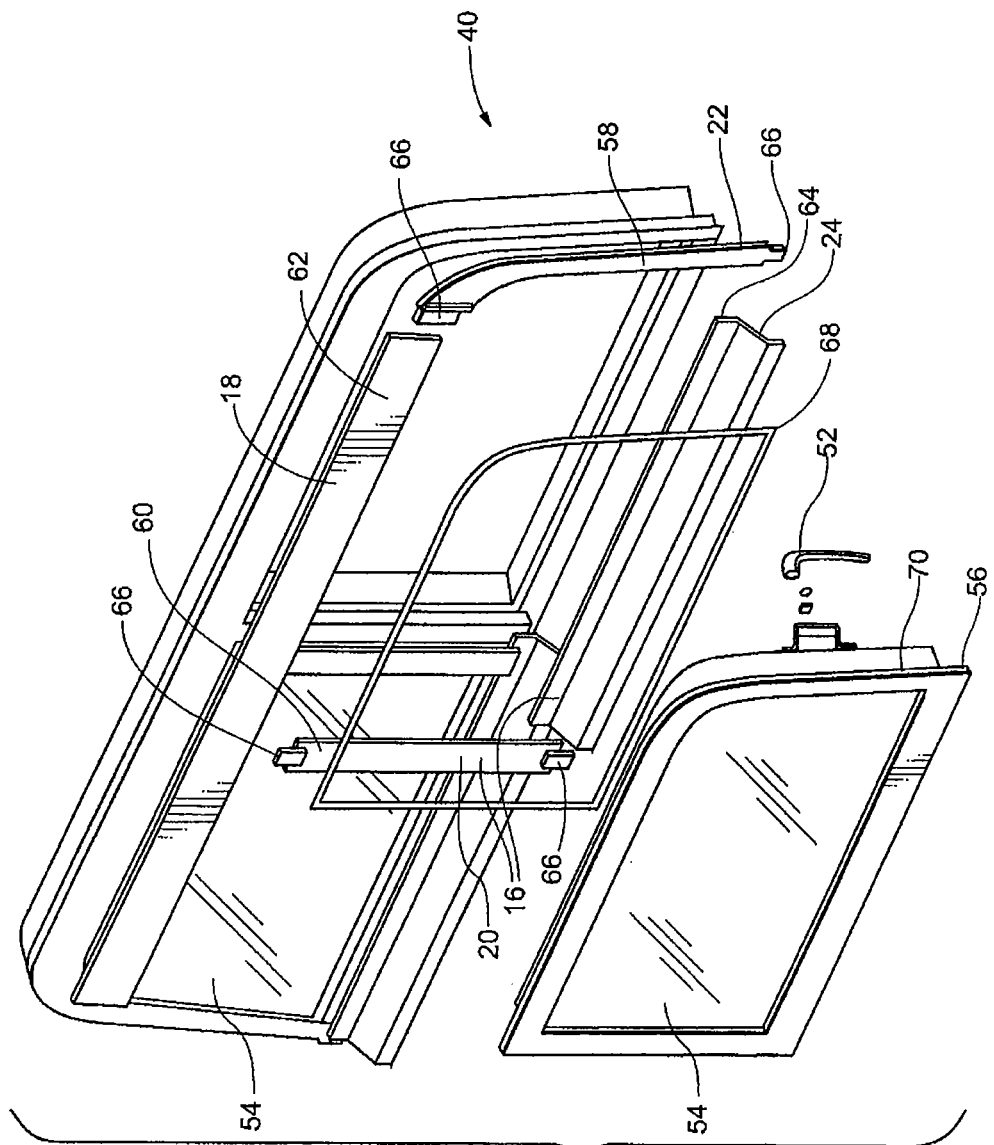
FIG. 4 is an exploded perspective view of a M1114 windshield assembly with the embodiment of the present invention of FIG. 3.
Figure 5:
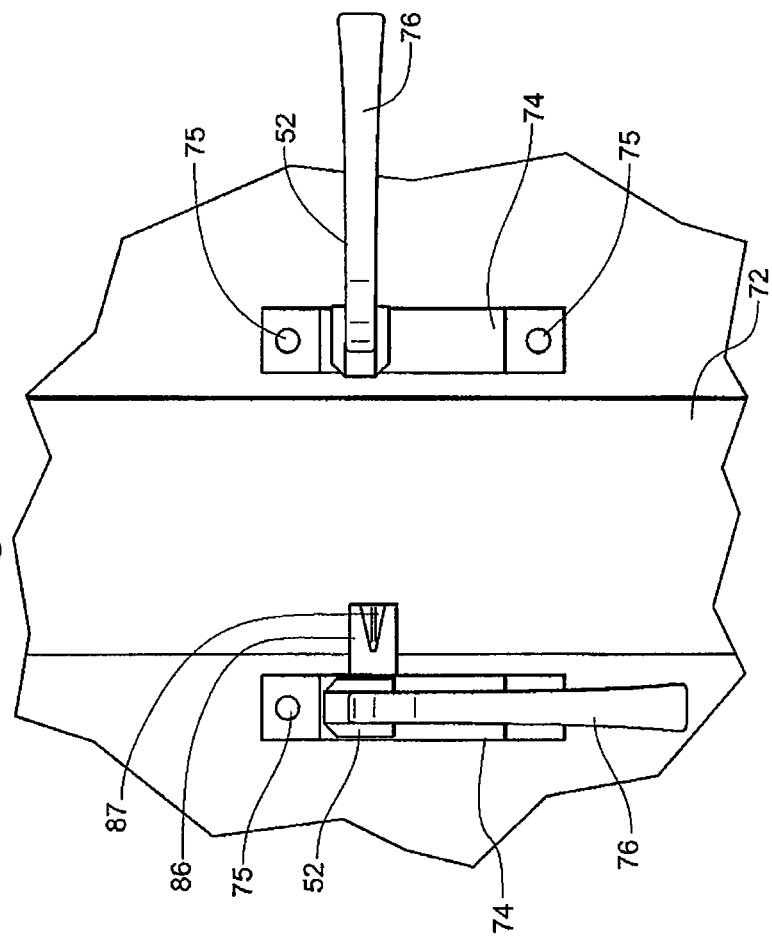
FIG. 5 is a side plan view of the latch mechanism of a first embodiment of the present invention where one latch is shown open and one latch is in the closed position.
Figure 6:
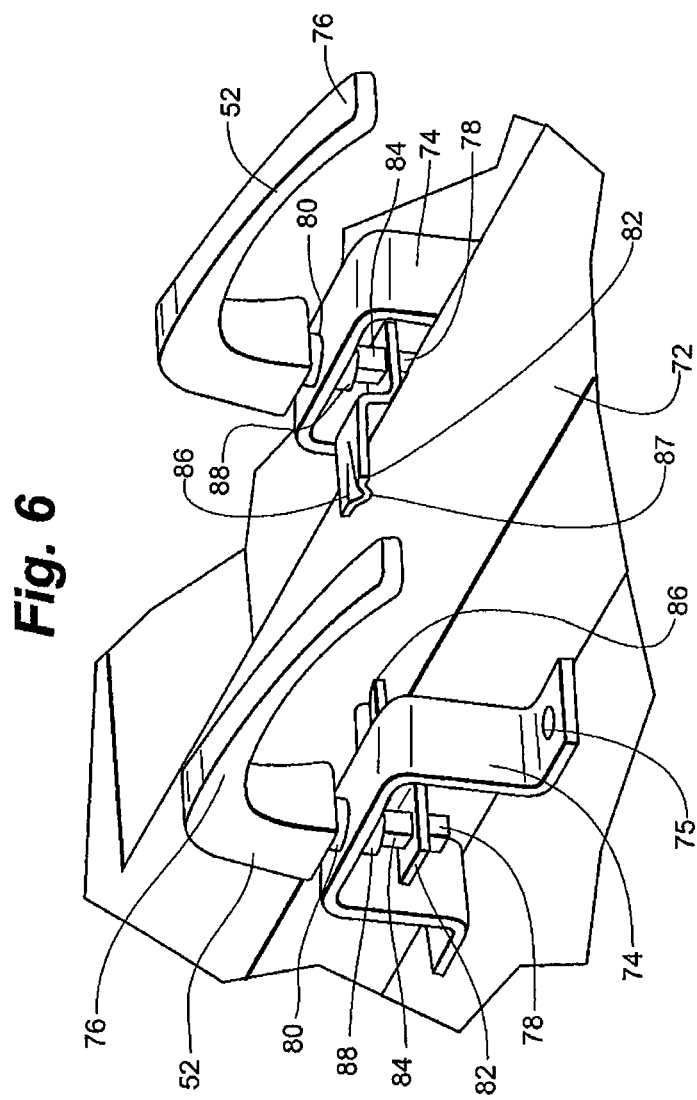
FIG. 6 is a perspective view of the latch mechanism of a first embodiment of the present invention.
Figure 7:
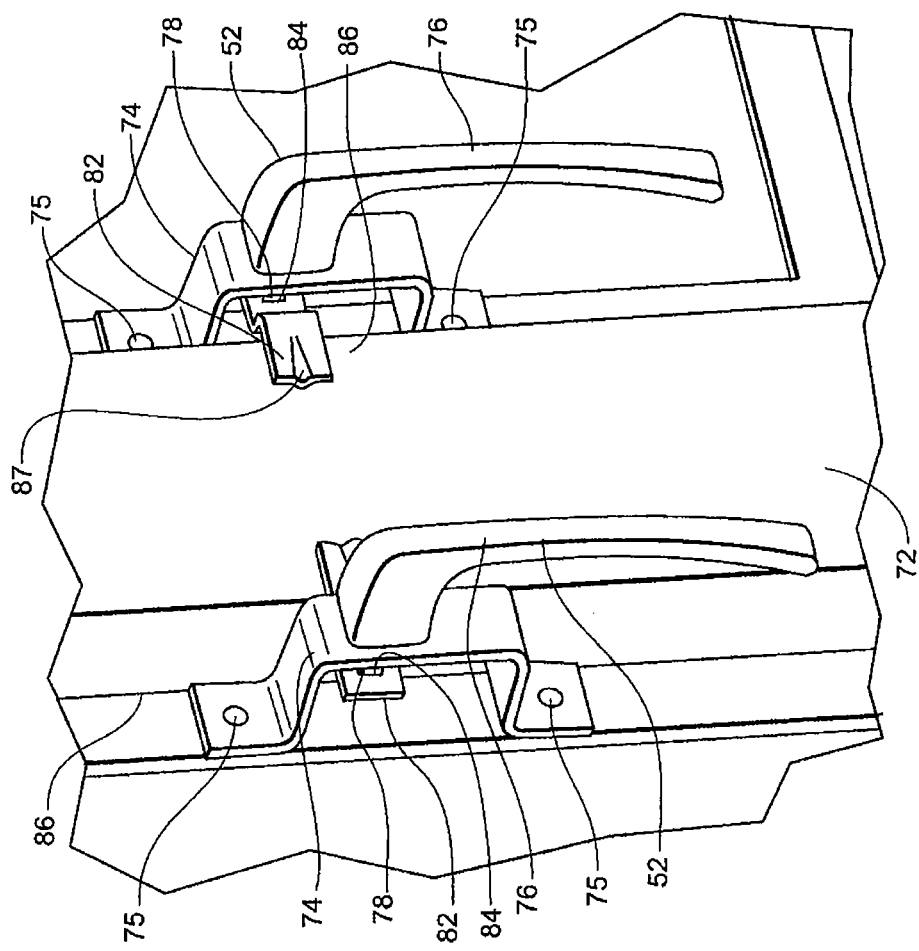
FIG. 7 is a perspective view of the latch mechanism of a first embodiment of the present invention.
Figure 8:
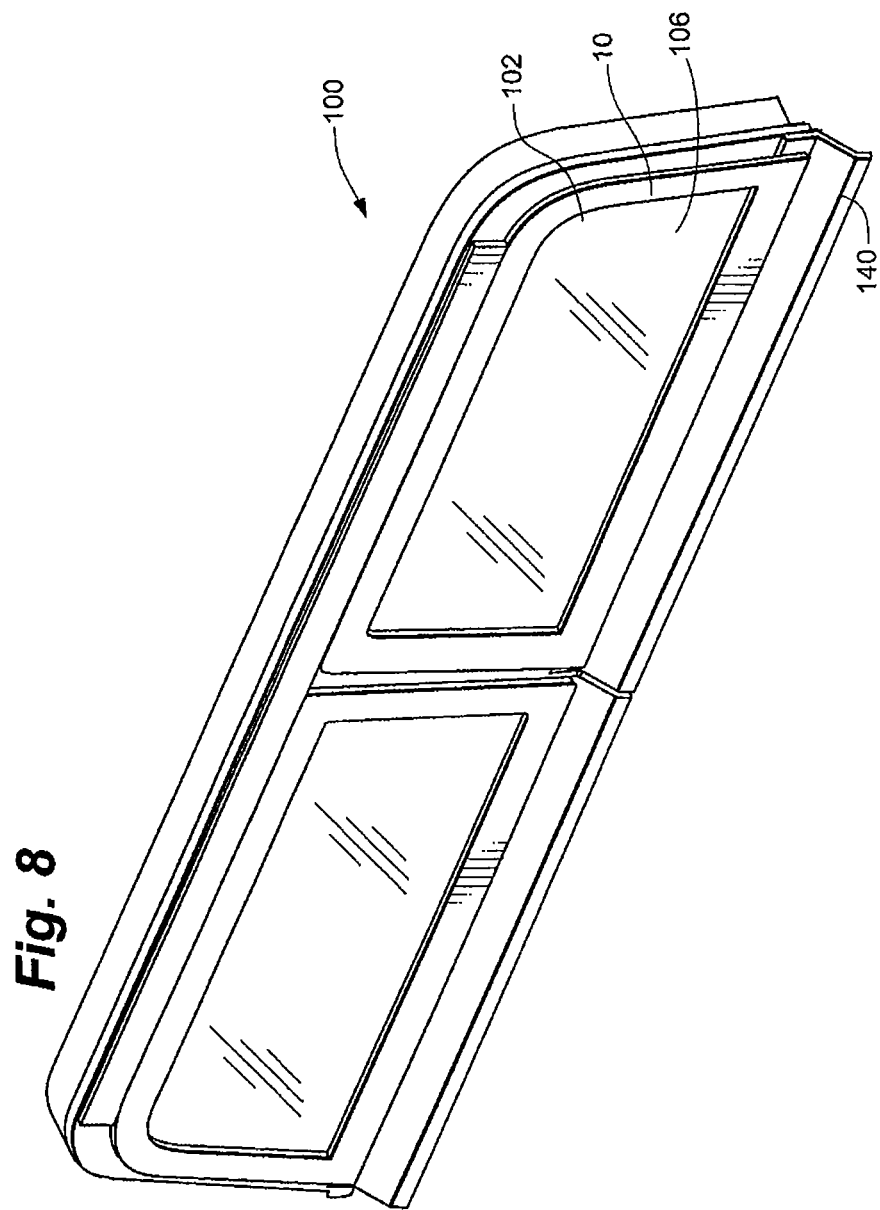
FIG. 8 is a perspective view of another embodiment of the present invention.
Figure 9:
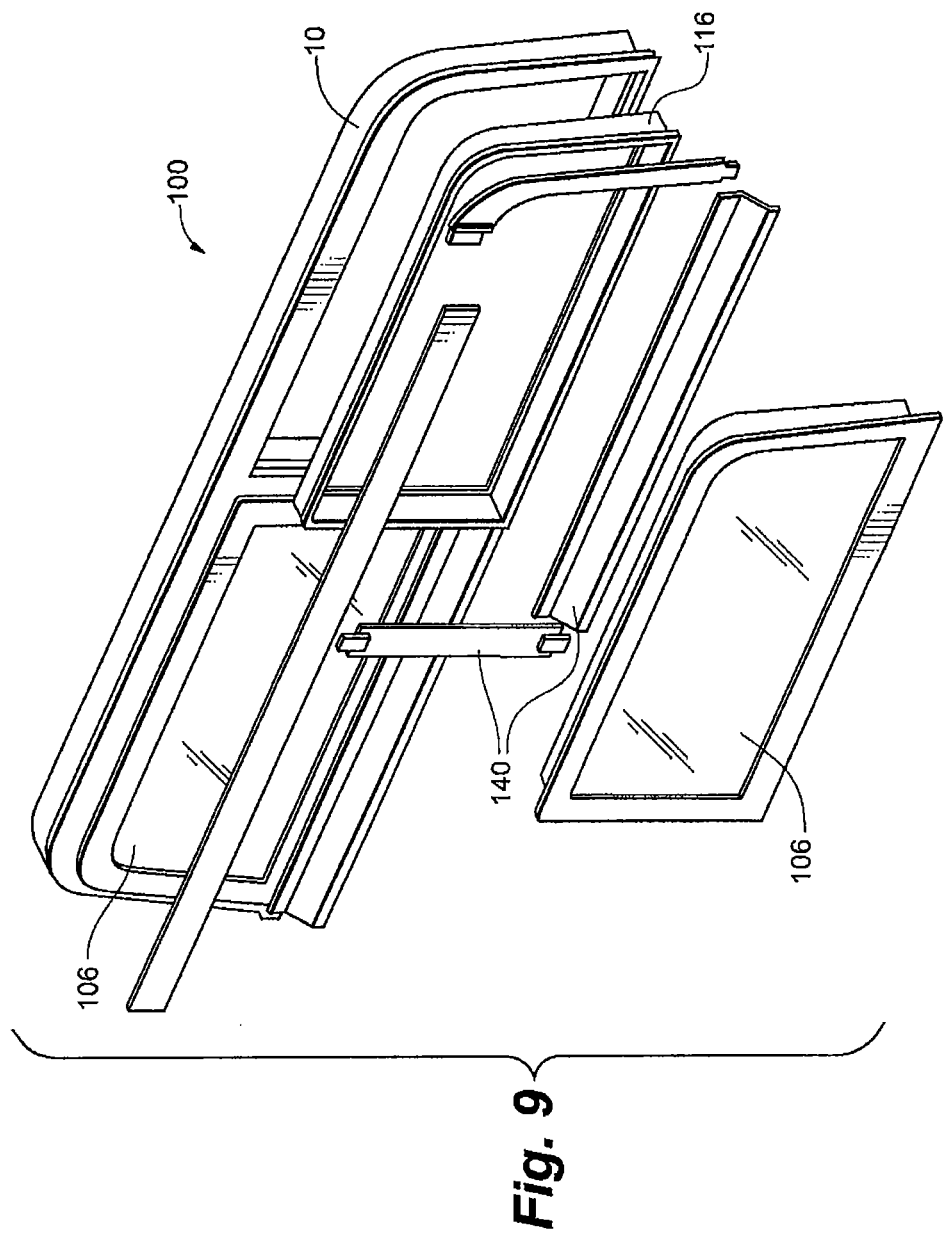
FIG. 9 is an exploded perspective view of the components of the embodiment of FIG. 8.
Figure 10:
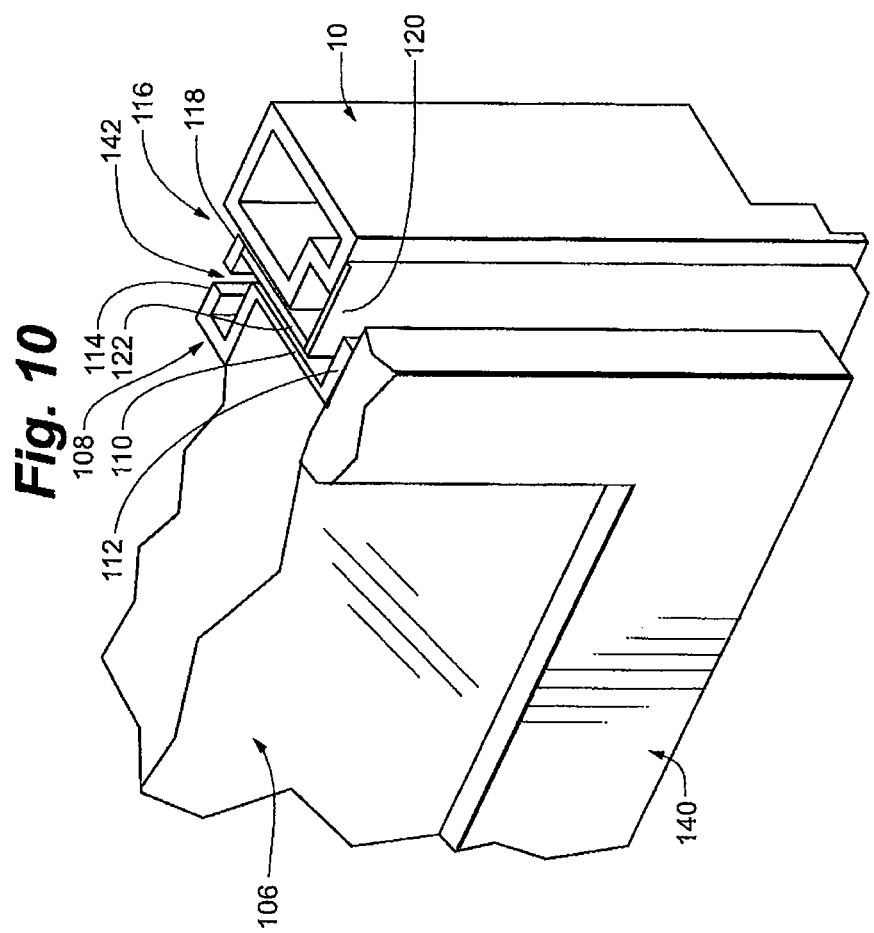
FIG. 10 is a cut away perspective view of the embodiment of FIG. 8.
Figure 11:
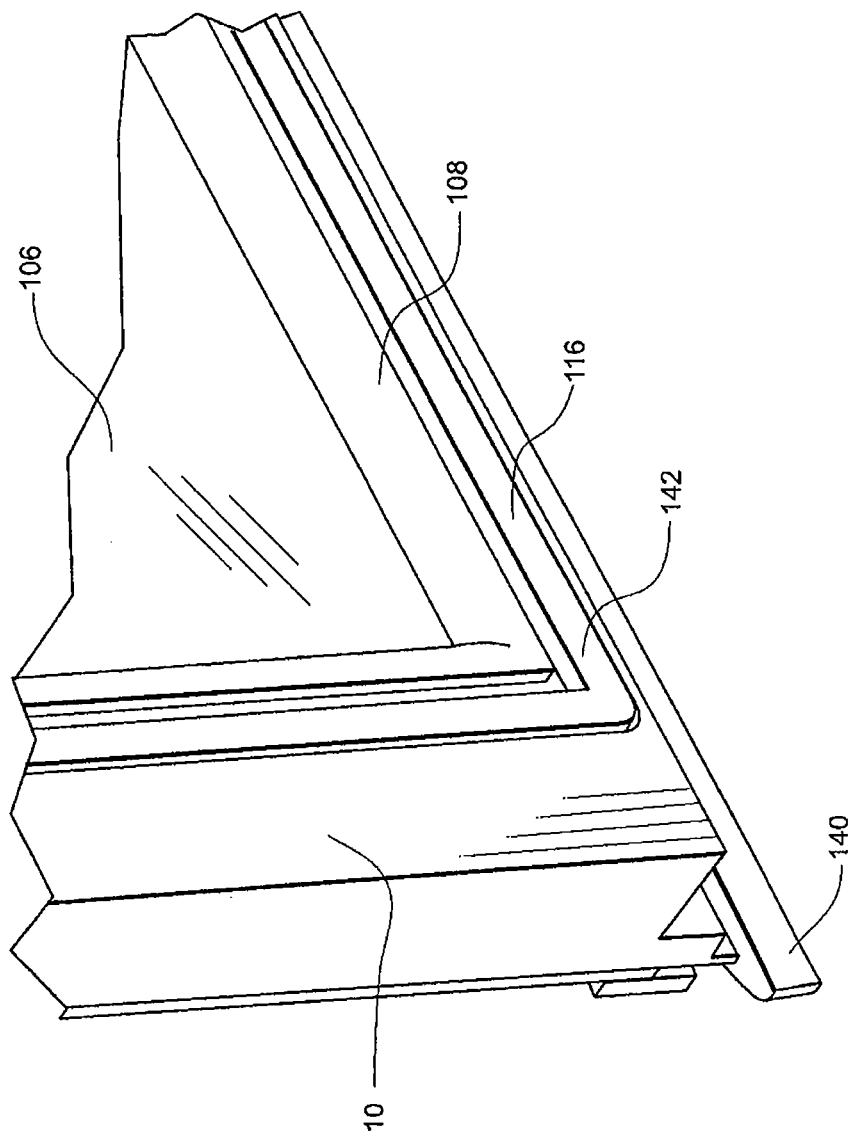
FIG. 11 is a perspective view of the interior side of the window depicted in FIG. 8.
Figure 12:
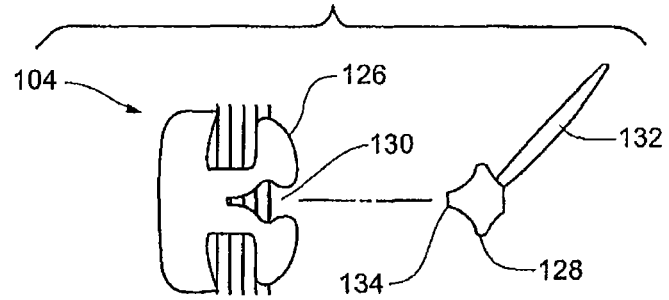
FIG. 12 is a cross sectional view of the gasket assembly of the embodiment depicted in FIG. 8.

In one embodiment, the present invention egress assembly 40 includes a transparent armor assembly 50 with a rotary locking mechanism 52. As illustrated in FIGS. 3-7 the standard M1114 window frame 10 as previously described with reference to FIGS. 1 and 2 is utilized with modifications to the above described prior art transparent armor 14. Here, the transparent armor assembly 50 includes a transparent armor pane 54 surrounded about the perimeter by an armor flange 56. The armor flange 56 extends peripherally from transparent armor pane 54 to support the transparent armor pane 54 within window frame 10. In assembly, the armor flange 56 is disposed exterior to window frame 10, supported by the outer margin of the window frame 10. In order to incorporate transparent armor assembly 50 into the overall armor condition of the M1114 or like vehicle, the window spacer/sill 16 is preferably modified. Specifically, side armor plates 22 have an exterior side face 58 that is narrowed. Likewise, center armor plate 20 has a narrowed exterior center face 60 and upper window armor plate 18 includes a narrowed exterior upper face 62. Lower window armor plate 24 includes a raised flange 64 that provides a support backing for the armor flange 56. Side armor plates 22 and center armor plate 20 may also include connector flanges 66 on the opposing vertical ends. The connector flanges 66 extend distally so as to overlap the upper window armor plate 18 and raised flange 64. A window gasket 68 is disposed between the interior face 70 of armor flange 56 and the outside margin of the window spacer/sill 16.

On the interior face 70 of transparent armor assembly 50, a plurality of rotary lock mechanisms 52 are mounted. It is understood that a single rotary lock mechanism 52 might be employed within opposed removable locking bracket in all embodiments employing rotary lock mechanism 52. Such bracket (not shown) might be U-shaped with a leg engaging the respective interior and exterior faces of the structure supporting the transparent armor assembly 50. A further embodiment is a hinge with a readily removable hinge pin. Other embodiments are also possible. Each (or the single) rotary lock mechanism 52 includes a lock support 74 and a lock handle 76 operably connected by a through shaft 78. Lock support 74 is a bracket with mounting apertures 75 positioned at opposing sides. While lock handle 76 is disposed on an exterior side of lock support 74, a cam 82 disposed on shaft 78 is positioned on the inboard side of lock support 74. The through shaft 78 is rectangular in this embodiment but may have any shape that interacts with the cam 82. Cam 82 includes a cam aperture 84 for mounted connection with through shaft 78. The cam 82 extends distally to a frame engaging portion 86. The frame engaging portion 86 may include a semicircular dimple 87 or a rounded valley to provide less resistance during rotation of lock handle 76. Lock handle 76 includes a cylindrical shaft lug 88 that extends through support aperture 80. The through shaft 78 then extends distally from cylindrical shaft lug 88.

In operation, the standard window is retrofitted with a modified transparent armor pane 54 to which a plurality of rotary lock mechanisms 52 are operably coupled. To remove the transparent armor pane 54, the vehicle occupants rotate lock handle 76 a ¼ turn to release cam 82 from contact with the interior of window frame 10 to unlock all interiorly disposed lock mechanisms on a selected transparent armor pane 54. The transparent armor pane 54 may then be pushed outward disengaging it from window frame 10. The occupants may egress through the resulting aperture or egress portal.

With a bracket, the single rotary lock mechanism 52 is unlocked. The transparent armor pane 54 is then pushed outward and slid slightly sideward to disengage the bracket from the window frame 10 to define an egress portal. With a hinge, the single rotary lock mechanism 52 is unlocked and the hinge pin removed. The transparent armor pane 54 is then pushed outward to define an egress portal.

The rotary lock mechanism 52 may be substituted by a slide bar, sash lock or other variant mounted to the transparent armor pane 54. For example, FIG. 13 includes an embodiment using the same transparent armor assembly 50 as discussed with reference to FIGS. 3-7 but substitutes a sliding latch assembly 90 for the rotary locking mechanism 52.

In one embodiment of the present invention of the egress assembly 100 as illustrated in FIGS. 8-12, the transparent armor assembly 102 is held in place by a gasket fastener 104. Utilizing standard window frame 10 and a modified external armor set 140 as a base, the transparent armor 106 is attached to vehicle window frame 108. The vehicle window frame 108 includes frame element 110 disposed about the perimeter of transparent armor 106. The exterior portion of vehicle window frame 108 includes armor flange 112. The interior portion of vehicle window frame 108 includes a distal gasket barrier 114. The distal gasket barrier 114 forms a "U" shape for partially restraining gasket fastener 104.

Outer fastener bracket 116 is disposed between vehicle window frame 108 and standard (prior art) window frame 10. The outer fastener bracket 116 includes proximal gasket barrier 118 at a first end and lower armor flange 120 at a second end connected by bracket connector 122. The bracket connector 122 extends generally parallel to the frame element 110. Proximal gasket barrier 118 and distal gasket barrier 114 form the gasket fastener gap 142.

Gasket fastener 104 bridges the gasket fastener gap 142 between proximal gasket barrier 118 and distal gasket barrier 114. Gasket fastener 104 is fabricated from molded rubber or a similar compliant material. Gasket fastener 104 includes gasket body 126 and gasket lock strip 128. Gasket body 126 includes an aperture or slot 130 disposed axially within gasket body 126 sized to accommodate gasket lock strip 128. Slot 130 is disposed on the interior (in the vehicle interior) portion of the egress assembly 100 when the egress assembly 100 is disposed in the window frame 10 and preferably extends around the full periphery of the transparent armor assembly 102. In this embodiment the gasket lock strip 128 has a triangular attachment face 134. A handle 132 may be attached to the gasket lock strip 128 for ease of removal.

In operation, disposing the gasket lock strip 128 in the slot 130 acts to expand the gasket fastener 104, thereby fixing the transparent armor assembly 102 in place. To disengage the transparent armor assembly 102, the occupant pulls handle 132 to remove gasket lock strip 128 from gasket body 126. This causes the gasket fastener 104 to relax its fixing grip on the transparent armor 106. The occupant can then apply force to transparent armor 106 so as to push it exterior to the vehicle, thereby creating an egress portal.

Figure 15:
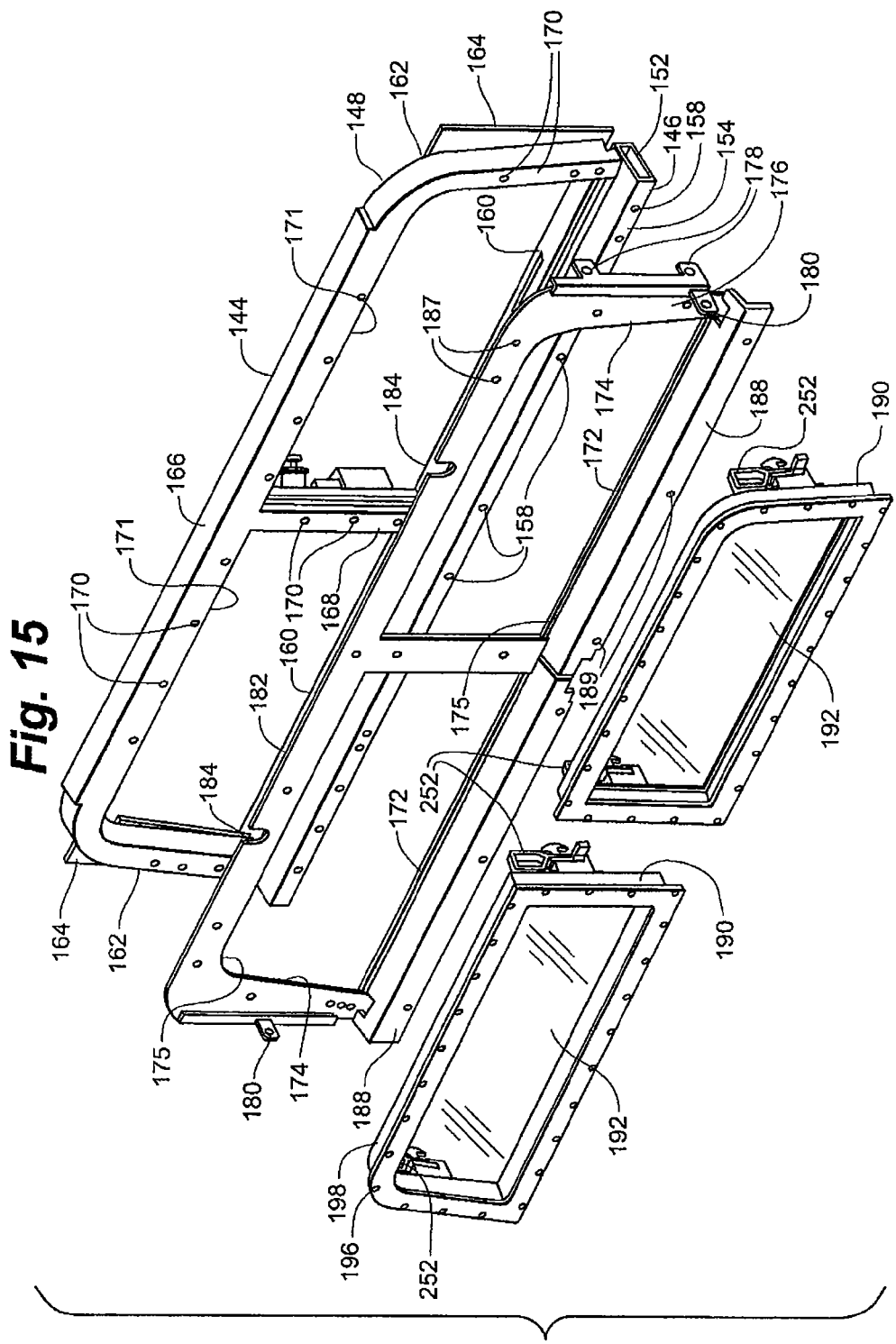
FIG. 15 is an exploded exterior perspective view of the integrated armor window assembly of FIG. 13.

The vehicle emergency egress assembly of a further embodiment present invention is depicted generally at 130 in FIGS. 15-17. An advantage of this embodiment is that the configuration implements an armor structure that is monolithic as opposed to an assembly of component armor plates in the prior art. The monolithic armor structure 140 of the present invention allows an integrated approach to be taken to addressing the armor and sill issue. The philosophy behind this configuration is to use the armor as the reference for the integration of the monolithic armor structure 140 with the vehicle. This approach eliminates tolerance and discontinuity issues with the vehicle window frame and further eliminates dealing with multiple armor components. The monolithic structure of the monolithic armor structure 140 allows for a more controlled armor design which facilitates a more reliable and robust sill design for the monolithic armor structure 140.

This approach has some key benefits over other approaches, as noted above. The combination of the two sides, the top, the bottom and the center armor plates being replaced by a single monolithic plate provides additional structural integrity to the vehicle window frame. An identified high risk associated with the vehicle emergency egress (VEE) window is the potential for the thin walled window frame to collapse and bind the window after an accident. The structure provided by the armor configuration of the present invention provides an exoskeleton capability to preserve the integrity of the window openings in the event of an accident and help to mitigate this risk. In addition to the armor plate, vertical channel sections may be integrated with the armor to provide an even greater structural enhancement.

The replacement of the component armor plates of the prior art with a monolithic armor structure 140 simplifies the seating interface of the vehicle emergency egress assembly 130. The prior art implementation with component armor plates presents a number of issues due to the potential misalignment of the planes of these plates and the resulting challenges to provide a planar seating surface for the window. Replacing the component armor of the prior art with the single monolithic plate results in a single seating surface that provides an optimum planar surface to interface with armor windows 142.

The construction of the monolithic armor structure 140 provides the opportunity to reasonably control the tolerance of the opening that accepts the armor windows 142. This capability, in conjunction with the philosophy of referencing the windows to the armor rather than to the window frame of the vehicle, is a significant benefit for the design of sill 202 in order to ensure a reliable and consistent fit.

The construction of the monolithic armor structure 140 further eliminates the interfaces of the component armor plates of the prior art and the need for gap protection in the gaps at the interfaces of the component armor plate. This is a benefit for the protection of the occupant's vehicle as well as simplification of the design of the sill 202, as noted below.

Figure 13:
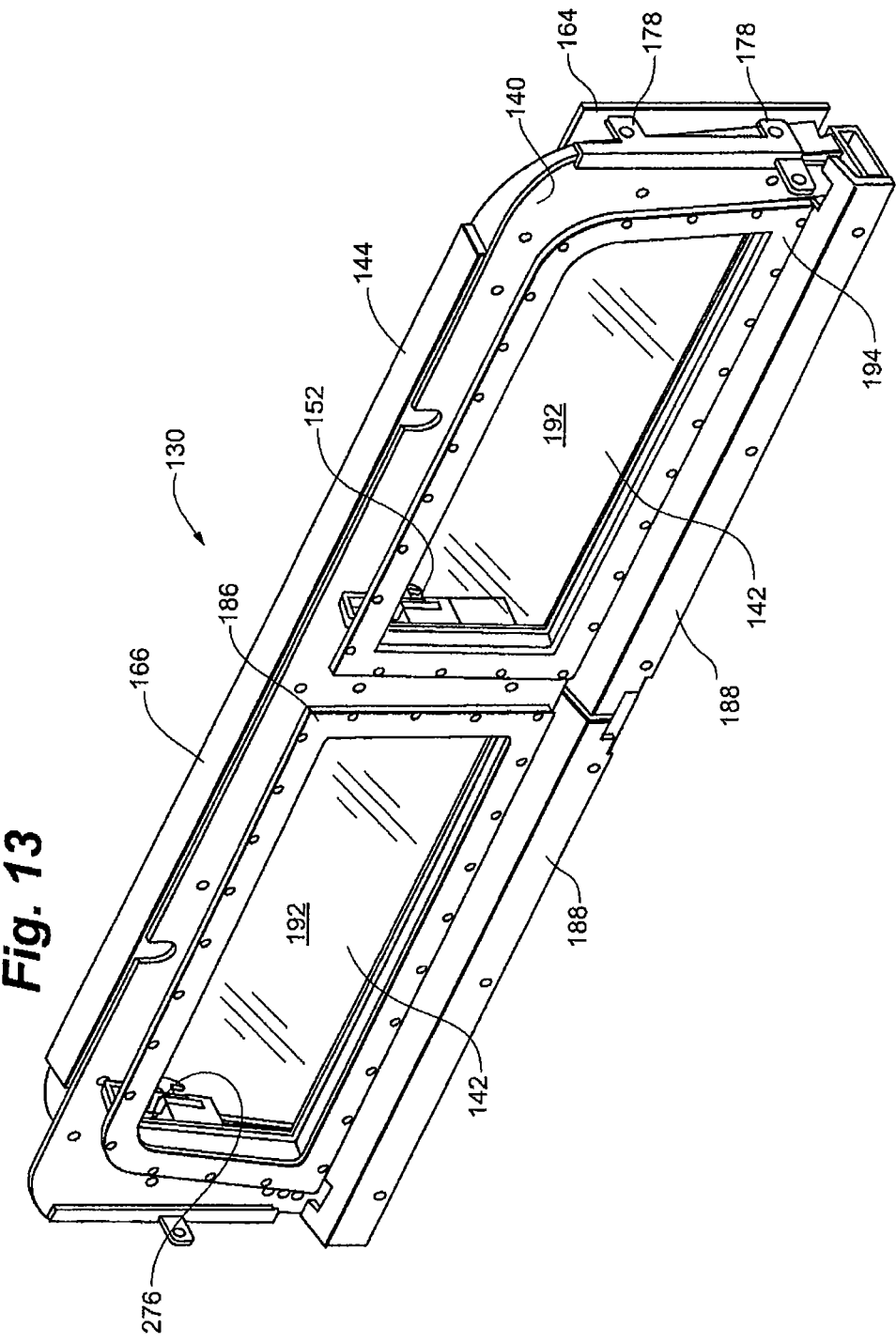
FIG. 13 is an exterior perspective view of an integrated armor window assembly of the present invention.
Figure 14:
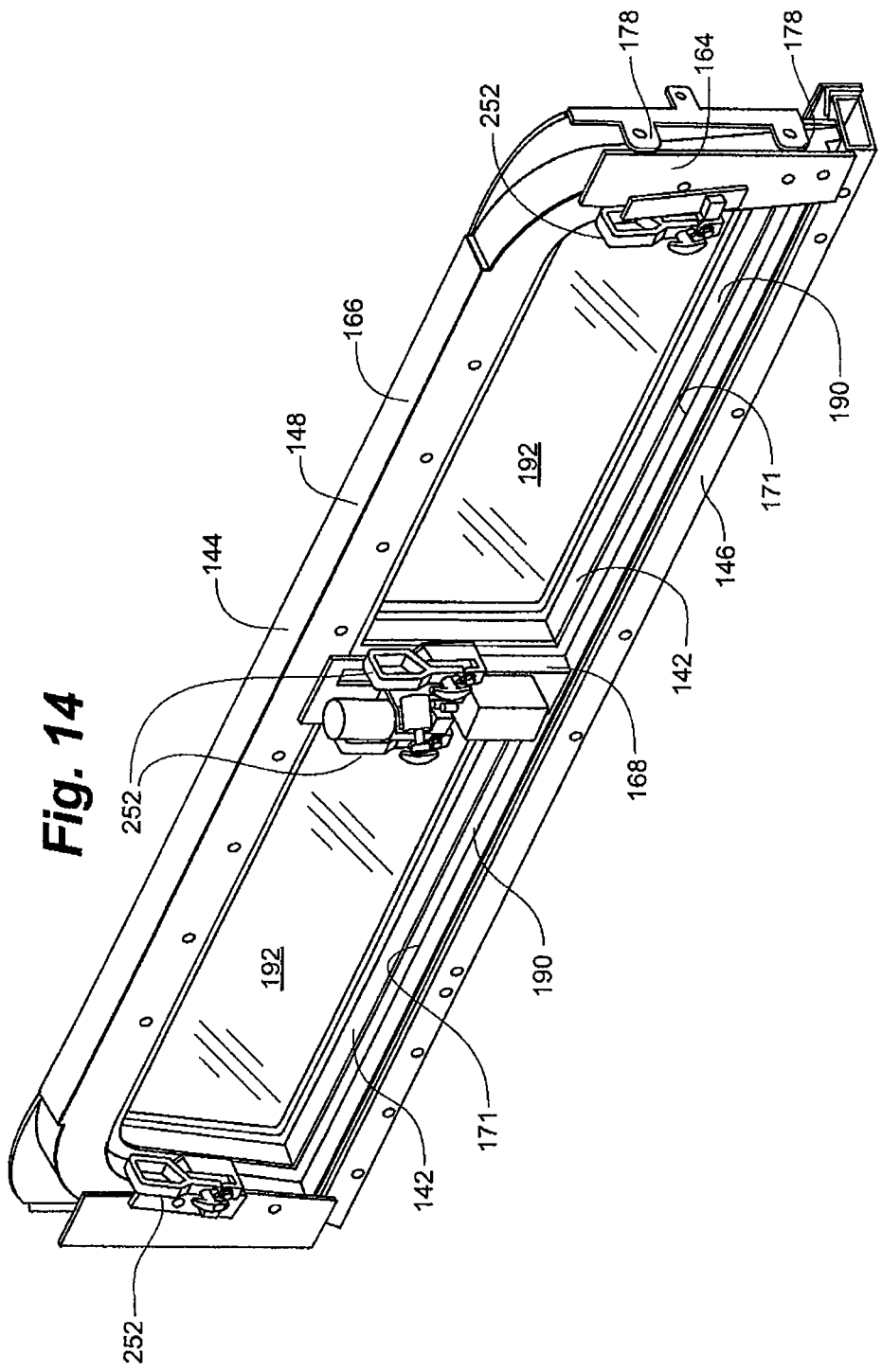
FIG. 14 is an interior perspective view of the integrated armor window assembly of FIG. 13.

The vehicle emergency egress assembly of this embodiment of the present invention is shown generally at 130 in the FIGS. 13-25. The vehicle emergency egress assembly 130 includes two major components, the monolithic armor structure 140 and the armor window(s) 142. As illustrated in FIGS. 13-15, the vehicle window frame 144, in this case, the standard M1114 window frame, noted as 10 above, is utilized. The vehicle window frame 144 includes sill 202 and a bow 148. The sill 202 is formed of a rectangular section tube 150. The rectangular section tube 150 defines an interior space 152. The sill 202 presents a forward directed margin 154. A plurality of bores 158 are defined in the forward margin 154.

The bow 148 is fixedly coupled to the sill 202. The bow 148 includes a base 160 that resides in part on the sill 202. A pair of opposed, spaced apart sides 162 are upwardly directed from the base 160. Each of the sides 162 includes a plate 164 fixedly coupled thereto on the inward directed face of the respective side 162.

A top 166 of the bow 148 extends between the sides 162 and is disposed in a generally parallel relationship with the base 160. A center bar 168 is centrally disposed along the base 160 and extends between the base 160 and the top 166. A plurality of bores 170 are defined in a forward directed faces of the sides 162, top 166, and center bar 168. The base 160, sides 162, top 166, and center bar 168 cooperatively define a pair of adjacent window apertures 171.

The monolithic armor structure 140 is integrally formed in a monolithic structure. The monolithic armor structure 140 includes a bottom plate 172. The bottom plate 172 is formed integral with a pair of side margins 176, a top margin 182, and a center plate bar 186 as a single unit. Each of the side margins 176 presents inward directed tabs 178. Further, each of the side margins 176 presents an outward directed tab 180. The top margin 182 extends between the respective side margins 176. The top margin 182 may include a notch 184 through which an accessory, such as a windshield wiper, may be directed. The integrally formed center plate bar 186 is centrally disposed with respect to the bottom plate 172 and the top margin 182 and extends between the bottom plate 172 and the top margin 182.

A preferably L-shaped sill bar 188 may be disposed overlying the sill 202 of the vehicle window frame 144. The sill bar 188 presents a plurality of forward directed bores 189.

The inner perimeter margin 175, defined in part by the bottom plate 172, the respective side margin 176, the top margin 182, and the center plate bar 186, defines a pair of respective adjacent transparent armor assembly (TAA) apertures 174.

The second component of the vehicle emergency egress assembly 130 is the armor window 142, as depicted in FIGS. 16-19. The armor window 142 includes a frame 190. The frame 190 peripherally supports an armor pane 192. The frame 190 is disposed about the outer perimeter margin of the armor pane 192. An armor surround 194 is fixedly coupled to the forward directed face of the frame 190. The armor surround perimeter 196 of the armor surround 194 has greater dimensions than the frame perimeter 198 of the frame 190, thereby forming an inward directed flange 200, as depicted in FIGS. 17 and 19.

A interiorly accessible release means 250 illustrated in FIGS. 15-19, 24 and 25 as a plurality of rotary lock mechanisms 252 are mounted on the interior face 272 of armor window 142. Each rotary lock mechanism 252 includes a lock support 274 and a lock handle 276 operably, rotatably connected by shaft 278 (being a bolt in this case) to the frame 190. The lock handle 276 includes a handle 279 and a cam 280. The handle 278 preferably has a grasping aperture 282 defined therein. A locking pin 284 extends through a bore 286 defined in the lock handle 276. The shank (not shown) of the locking pin 284 extends through the bore 286 and into a blind bore (not shown) defined in the supporting lug 288. The locking pin 284 must be withdrawn before the lock handle can be rotated to unlock the armor window 142. In the locked disposition depicted if FIGS. 18*a*. 18*b*, 19*a*, and 19*a*, the cam 280 is designed to lockingly engage the inward directed face of the plate 164 of the vehicle window frame 144, thereby locking the armor window 142 in place. Unlocking motion is as indicated by the arrow 290 of FIG. 8*b*. In the unlocked disposition, the armor window 142 may be readily manually ejected outward, thereby exposing the transparent armor assembly aperture 174, forming an egress portal through which a vehicle occupant may egress the vehicle.

Figure 20:
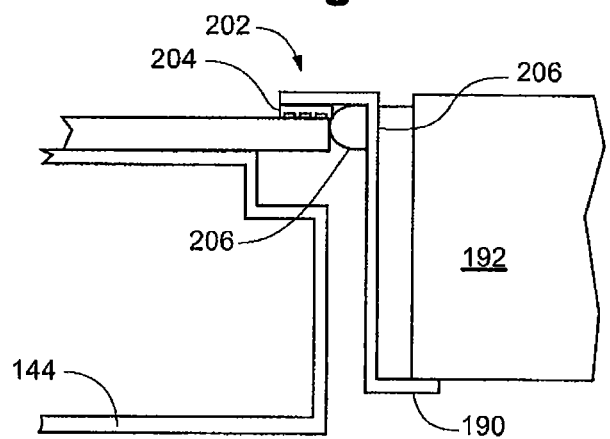
FIG. 20 is a top plan view of the seal integration.

The sill integration of the present invention is depicted in FIG. 20. The sill 202 of the vehicle emergency egress assembly 130 must perform two functions. The first function is to provide a barrier to contaminants that may enter the crew cab via the interface of the armor window 142 in the monolithic armor structure 140. This function is the classic weather sill function. The second function is to provide means for positioning the armor window 142 in the center of the transparent armor assembly aperture 174 of the monolithic armor structure 140 and to provide the feature that holds the armor windows 142 in place. This second function is required because the dimensions of the transparent armor assembly aperture 174 and of the window aperture 171 defined in the vehicle window frame 144 are larger than the frame perimeter 198 of the frame 190 of the armor window 142. The sill 202 must support and cushion the armor window 142 in the up/down and left/right directions.

The sill 202 preferably includes two separate sills, flat sill 204 and raised sill 206. Highly compressible EPDM foam preferably provides the classic weather sill function. Other compliant materials may be used as well. This foam comprises the flat sill 204. The flat sill 204 is adhesively bonded to the inward directed flange 200 of the armor window 142. The flat sill 204 is extended around the entire perimeter of the inward directed flange 200. The flat sill 204 compresses against the structure of the monolithic armor structure 140 when installed on the vehicle.

Figure 21:
FIG. 21 is a perspective view of a first seal.

FIG. 21 illustrates a preferable COT profile that is preferentially implemented for the flat sill 204. The specific material is provided by Clean Seal, Inc., of South Bend, Ind., and provides a compression deflection of 25% at 2-5 PSI. This correlates to approximately 80-195 lbs compression (preload from the combined two rotary lock mechanisms 252) on each armor window 142. This compression compresses the material of the flat sill 204 approximately 0.050 inches.

Figure 22:
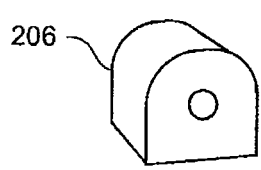
FIG. 22 is a perspective view of a second seal.

The raised sill 206 is illustrated in FIG. 22. Raised sill 206 is a D-Section sill that provides the means of positioning the armor window 142 in the center of the transparent armor assembly aperture 174 and in holding the armor window 142 in place. The raised sill 206 is adhesively bonded under the inward directed flange 200 to the frame 190 around the entire perimeter of the frame 190. The raised sill 206 slightly compresses against the monolithic armor structure 140 when installed on the vehicle. The height dimension of the D-Section of the raised sill 206 is a function of the current armor window 142 dimension specified in the monolithic armor structure 140.

Figure 23:
FIG. 23 is a perspective view of a second embodiment of the second seal.
Figure 24:
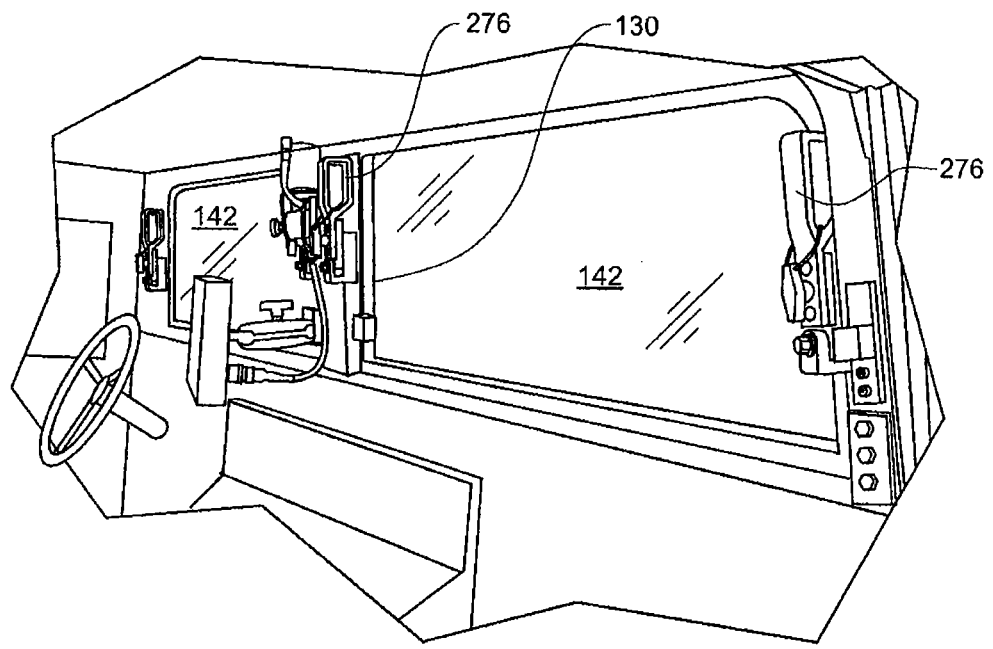
FIG. 24 is an interior perspective of the vehicle emergency egress window of the present invention.
Figure 25:
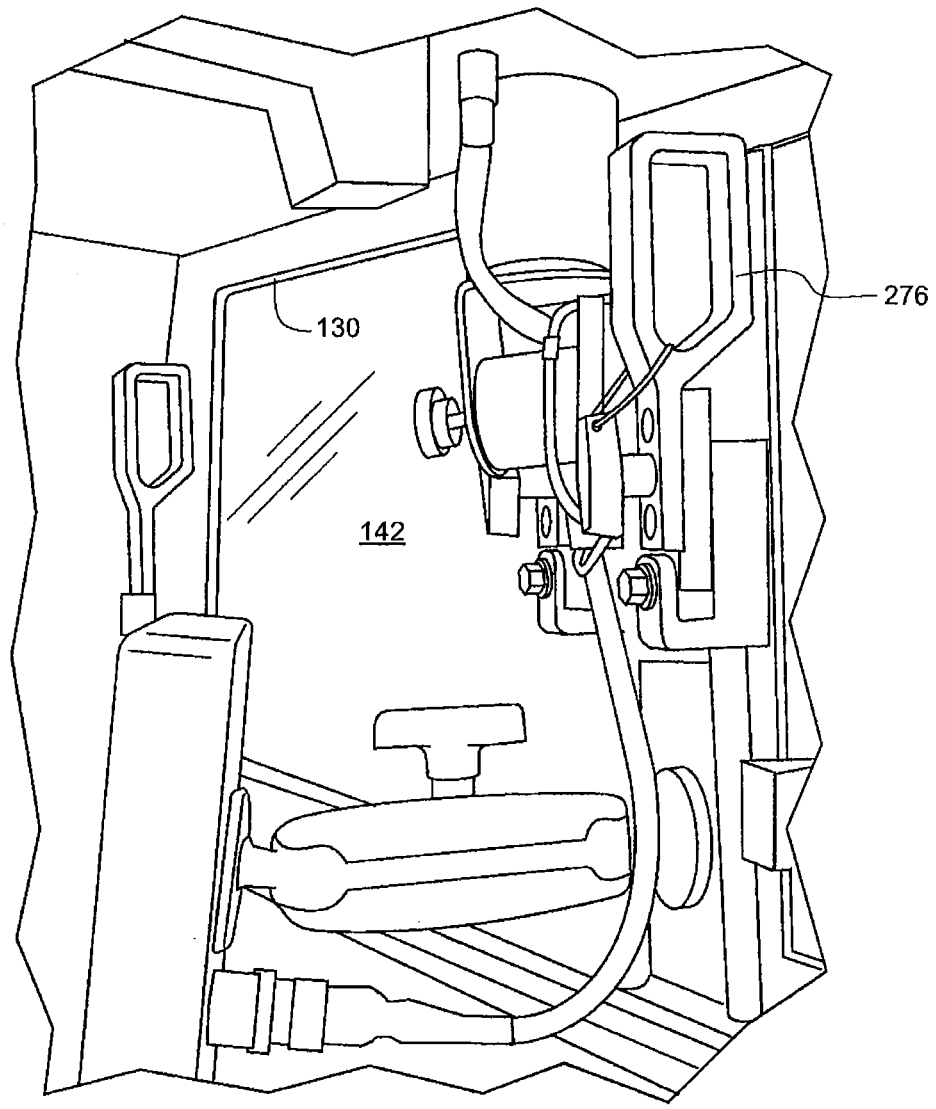
FIG. 25 is an enlarged interior perspective of a portion of the vehicle emergency egress window as depicted in FIG. 24.
Figure 82:
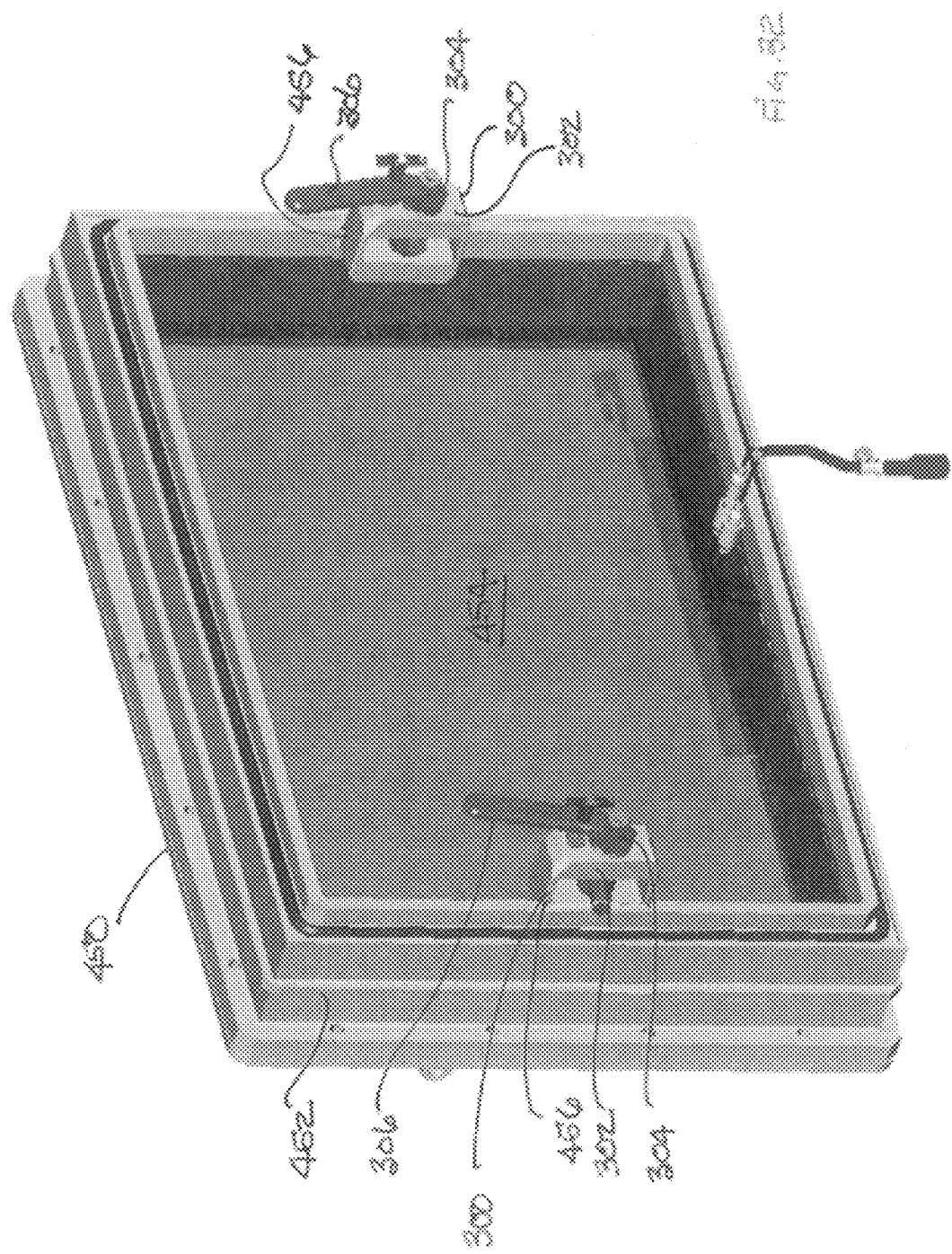

It may be advantageous to substitute a more dense sill material for the raised sill 206 along the bottom margin of the armor window 142 in order to better support the weight of the armor window 142. For this area, EPDM bar stock, as depicted in FIG. 23, may be substituted for the D-Section raised sill 206.

In assembly, the monolithic armor structure 140 is mated to the vehicle window frame 144 by means of suitable fasteners disposed through the bores 187 that extend around the perimeter of the monolithic armor structure 140. The fasteners then engage the frame bores 170 defined in the vehicle frame 144. The positioning of the monolithic armor structure 140 with respect to the vehicle window frame 144 is determined by the abutment of the inward directed tabs 178 against the outward directed face of the plate 164. After the monolithic armor structure 140 is in place, the sill bar 188 may be affixed to the sill 202 of the vehicle window frame 144. Again such fixation is effected by fasteners passing through the forward directed bores 189 defined in the sill bar 188 and coupling with the bores 158 defined in the sill 202.

After the monolithic armor structure 140 is affixed to the vehicle, the two armor windows 142 may be inserted into the transparent armor assembly apertures 174 from the outside of the vehicle. Such insertion effects the sealing of the sill 202 with the monolithic armor structure 140, clamping rotation of the rotary lock mechanisms 252 into the locked disposition effecting compression of the flat sill 204.

A universal latch mechanism 300 is depicted in FIGS. 26-34 of the present application. The design of the universal latch mechanism 300 solves issues that potentially arise with previous latch designs. A problem is that in order to get the latch that is attached to the TAA to mate with the frame of the vehicle, metallic shims are utilized to initially install the TAA into the window frame such shimming allows the latch mechanism to compressively engage the frame.

A secondary issue with certain TAA designs is the very large amount of force required to initially compress the window seal during the initial installation of the TAA in the vehicle such TAA design requires the use of an assembly tool, which in practice is a prybar, in order to draw the TAAs efficiently into the vehicle frame. The universal latch mechanism 300 addresses these two issues by the use of a threaded adjustable element which also doubles as a method of initially compressing the window seal. The universal latch mechanism 300 is accordingly more easily adaptable to a wide variety of future vehicles that may get the requirement to add TAA assemblies.

The universal latch mechanism 300 is depicted in FIGS. 26-34 of the present application. Universal latch mechanism 300 includes three major subcomponents: body 302, shank mechanism 304, and handle assembly 306.

Referring principally to FIGS. 26 and 27, the body 302 of the universal latch mechanism 300 has a bottom surface 310 that is typically brought into contact with the glass pane 454 of the TAA 450 (see FIGS. 33 and 34). Two opposed end faces 312 extend orthogonally from the bottom surface 310. Each of the end faces 312 terminates in a bevel edge 314 that mates with respective ends of a top surface 316. The body 302 additionally includes two opposed side faces 318 that are parallel and extend between the bottom surface 310 and the top surface 316.

A transverse aperture 320 extends between the respective side faces 318. The transverse aperture 320 is preferably rectangular in shape. The transverse aperture 320 has opposed aperture walls 322 that are generally in a parallel relationship with the respective end faces 312. The transverse aperture 320 has an upper margin that in part defines an upper block 321a and a lower margin that in part defines a lower block 321b. The blocks 321a, 321b are supported by opposed aperture walls 322.

A through bore 324 extends through the blocks 321a, 321b. Referring to the portion of the through bore 324 that extends through upper block 321a, the intersection of the through bore 324 with the top surface 316 is defined by a beveled edge 326. The remainder of the through bore 324 that is defined in the upper block 321a is comprised of a threaded bore portion 328. The portion of the through bore 324 that extends through the lower block 321b is comprised of a smooth bore 330. The portion of the smooth bore 330 that intersects the transverse aperture 320 is defined by a neck 332. The neck 332 has a somewhat greater diameter than that of the smooth bore 330.

A generally smaller diameter blind bore 340 has a longitudinal axis that is generally parallel to the longitudinal axis of the through bore 324 and is disposed adjacent to, but spaced apart from, the through bore 324.

The body 302 is preferably machined as a unitary device.

The second component of the universal latch mechanism 300 is the shank mechanism 304. Shank mechanism 304 includes a bushing 350. Bushing 350 has an axial through bore 352. The exterior margin of the bushing 350 is defined by a shank 354 that has a generally smooth, circular exterior margin. The shank 354 is topped with a collar 356 that has a somewhat greater diameter than the diameter of the shank 354.

Shank mechanism 304 further includes an engaging member 360. Engaging member 360 has a first shank 362. First shank 362 has an exterior margin that is circular in cross-section and the diameter of first shank 362 is slightly less than the diameter of through bore 352 of bushing 350.

Waist 364 of the engaging member 360 is generally circular in cross-section and has a diameter that is somewhat greater than the diameter of first shank 362. Referring in particular to FIG. 31, waist 364 includes a transverse blind bore 366. A concentric intersecting bore 370 is defined through the wall of the waist 364 intersecting the blind bore 366.

An engaging member that is preferably an engaging pin 372 is formed generally circular in cross-section and has an axial threaded blind bore 374 defined therein. The diameter of the engaging pin 372 is slightly less than that of the blind bore 366 defined in the waist 364. A threaded bolt 376 is included for passing through the intersecting bore 370 and being threaded into the threaded blind bore 374. A washer 378 may be interposed between the head of the bolt 376 and a flattened portion of the exterior surface of the waist 364.

A second shank 380 is disposed on the opposite side of the waist 364 as the first shank 362. The second shank 380 includes an O-ring groove 382 defined in the exterior surface of the second shank 380. A transverse notch 384 is formed at the distal end of the second shank 380. An axial threaded bore 386 is defined in the second shank 380 proximate the center of the transverse notch 384. A further component of the shank mechanism 304 is an O-ring 388 that may be disposed in the O-ring groove 382.

Additionally, the shank mechanism 304 includes a shiftable member that is preferably a bushing 390. The bushing 390 has a externally threaded shank 392 that is capped with a hex collar 396. An axial bore 394 extends through the bushing 390. The axial bore 394 is sized such that second shank 380 may be disposed therein. The threaded shank 392 of the bushing 390 is formed such that the threaded shank 392 may be threadedly engaged with the threaded bore portion 328 of the body 302.

The third component of the universal latch mechanism 300 is the handle assembly 306. Handle assembly 306 includes a handle 400. Indented faces 402 are defined at an end of the handle 400. A bore 404 is defined through the handle 400 between the two indented faces 402. A pair of side-by-side locking bores 406 are defined through the handle 400 proximate, but spaced apart from, the indented faces 402. FIGS. 28 and 29 depict an alternate configuration handle 400a, having a looped gripping portion 401.

Referring specifically to FIG. 28, the handle assembly 306 further includes a locking pin 410. The locking pin 410 has a hollow shank 412. A plurality of laterally translatable detent balls 414 are disposed proximate the distal end of the hollow shank 412. A concentric actuator 416 is disposed within the hollow shank 412 and is actuated by depressing the actuator button 418. A spring 419 is disposed in biasing engagement with the detent balls 414 in order to bias the detent balls 414 in the extended disposition as indicated in FIG. 28.

The locking pin 410 further includes a T handle 420. The actuator button 418 projects from the T handle 420. A lanyard bore 422 is defined in the T handle 420. A safety lanyard 424 includes a fixed loop 426 that is passed through the lanyard bore 422 and secured in such disposition. A second end of the safety lanyard 424 is affixed to a washer 428.

A final component of the handle assembly 306 is a bushing receiver 430. The bushing receiver 430 includes a shank 431 that is topped with a collar 432 having flats 434 defined thereon. An axial bore 436 is defined through the bushing receiver 430.

In assembly, it is helpful to understand that the TAA 450, as depicted in FIGS. 30, 31 and 32 has a generally rectangular frame 452 that encloses a transparent pane 454. The body 302 of the universal latch mechanism 300 is preferably machined as an integral, separate unit. The body 302 is then preferably adhered to the frame 452 as by a weldment 456. Referring again to FIG. 27, the shank mechanism 304 and handle assembly 306 may then be assembled with the body 302. This is preferably accomplished by mating the three bushings 350, 390, and 430 with the body 302. The bushing 350 is inserted into the smooth bore 330. The bushing 430 is pressed into the blind bore 340. The engaging member 360 may then be passed through the through bore 324 to a disposition in which the first shank 362 is received within the through bore 352 of the bushing 350. In such disposition, the engaging pin 372 may be coupled to the engaging member 360 by inserting the engaging pin 372 into the blind bore 366 and affixing it in such disposition by means of the bolt 376 and washer 378. At this point, the O-ring 388 may be slipped over the second shank 380 to engage the O-ring groove 382.

The next assembly step is to partially thread the bushing 390 into the threaded bore portion 328 of the body 302. In such disposition, the second shank 380 of the engaging member 360 is disposed at least in part within the axial bore of the bushing 390. The bushing 390 should be threaded in far enough that the transverse notch 384 extends beyond the hex collar 396 of the bushing 390. In this disposition, the handle 400 may be coupled to the engaging member 360. The abovenoted coupling is effected by disposing the narrowed portion of the handle 400 that is formed by the opposed indented faces 402 into the transverse notch 384 of the engaging member 360. The washers 428 and 440 are then positioned over the bore 404 and the bolt 438 passed through the washers 428, 440 and the bore 404 to engage the axial threaded bore 386 defined in the engaging member 360.

The locking pin 410 is then coupled to the safety lanyard 424 by means of the fixed loop 426. The actuator button 418 may then be depressed to cause the dent balls 414 to be retracted. In such disposition, the locking pin may be passed through either of the locking bores 406 defined in the handle 400 and then passed through the axial bore 436 defined in the bushing receiver 430. As noted in FIG. 28, a fully inserted locking pin 410 extends below the lower margin of the shank 431 of the bushing receiver 430. In such disposition, the actuator button 418 can be released and the biasing spring 419 will cause the detent balls 414 to translate radially outward, thereby capturing the locking pin in place.

Operation of the latch mechanism 300 may be understood with reference to FIGS. 33 and 34. The fully assembled latch mechanism 300 is affixed to TAA 450 as noted above by being secured to the frame 452 of the TAA 450. The handle 400 is rotated to a disposition wherein the engaging member, engaging pin 372, is disposed within the transverse aperture 320. In this disposition, the TAA 450 may be inserted into the vehicle window sill 460, preferably from the exterior of the vehicle. The TAA 450 is typically a tight fit in the window sill 460. In order to fully seat the TAA 450 in the sill 460, the handle 400 of the latch mechanism 300 is rotated approximately ninety degrees to a disposition wherein the engaging pin 372 overlies the ramp 462. In this disposition, the shiftable member, bushing 390, is turned into the body 302, preferably by a common open end wrench engaged with the hex collar 396. Turning the bushing 390 into the body 302 acts to draw the TAA 450 fully into the sill 460 to its operating disposition. The TAA 450 and the latch mechanism remain in this disposition until an emergency egress from the vehicle is required. It should be noted that the sills 460 of various vehicles have rather wide tolerances of manufacture. The latch mechanism 300 has a desired universality in that engaging member 372 is shiftable relative to the transparent armor assembly frame 452 for accommodating a plurality of varying transparent armor assembly 450 to vehicle window sill 460 relationships.

Emergency egress is effected by withdrawing the locking pin 410 and rotating the handle 400 about ninety degrees to dispose the engaging pin 372 clear of the sill 460. The TAA 450 may then be pushed outward relative to the vehicle to define an egress portal.

While the invention is amenable to various modifications and alternative forms, specifics thereof have been shown by way of example in the drawings. It should be understood, however, that the intention is not to limit the invention to the particular embodiments described. On the contrary, the intention is to cover all modifications, equivalents, and alternatives.

The invention claimed is:

1. A vehicle emergency egress assembly, comprising:
    at least one transparent armor assembly being disposable in a vehicle window frame and including an armor assembly frame that supports at least one transparent armor pane; and
    a latch mechanism, the latch mechanism being selectively operable by a vehicle occupant for effecting release of the at least one transparent armor assembly, such release permitting shifting of the at least one transparent armor assembly from the vehicle window frame to define an egress portal and the latch mechanism having an engaging member movable within a plane generally parallel to the vehicle window frame between an engaging position in which a portion of the engaging portion overlaps with the vehicle window frame to retain the at least one transparent armor assembly within the vehicle window frame and a disengaged position in which the engaging portion is positioned out of alignment with the vehicle window frame to permit removal of the transparent armor assembly from the vehicle window frame, the latch mechanism also having a shiftable member for selectively moving the engaging member along an axis generally transverse to a plane parallel to the vehicle window frame for accommodating a plurality of varying transparent armor assembly to vehicle window frame relationships.

2. The vehicle emergency egress assembly of claim 1, the latch mechanism including a shiftable member operatively coupled to the engaging member wherein selectively shifting the shiftable member when the engaging member is engaged with the vehicle window sill effects drawing the transparent armor assembly into the vehicle window sill.

3. The vehicle emergency egress assembly of claim 1, wherein the latch mechanism shiftable member is a threaded bushing.

4. The vehicle emergency egress assembly of claim 3, wherein the threaded bushing is threadedly engaged with a latch mechanism body, the latch mechanism body being fixedly couplable to the transparent armor assembly frame.

5. The vehicle emergency egress assembly of claim 2, wherein the latch mechanism shiftable member is a threaded bushing.

6. The vehicle emergency egress assembly of claim 5, wherein the threaded bushing is threadedly engaged with a latch mechanism body, the latch mechanism body being fixedly couplable to the transparent armor assembly frame.

7. The latch mechanism of claim 1, the latch mechanism assembly including a shiftable member operatively coupled to the engaging member wherein selectively shifting the shiftable member when the engaging member is engaged with the vehicle window sill effects drawing the transparent armor assembly into the vehicle window sill.

8. The latch mechanism of claim 7, wherein the latch mechanism assembly shiftable member is a threaded bushing.

9. The latch mechanism of claim 7, wherein the threaded bushing is threadedly engaged with a latch mechanism assembly body, the latch mechanism assembly body being fixedly couplable to the transparent armor assembly frame.

* * * * *